US009362986B2

(12) United States Patent
Karaoguz et al.

(10) Patent No.: US 9,362,986 B2
(45) Date of Patent: Jun. 7, 2016

(54) WIRELESS POWER SYSTEM WITH SELECTABLE CONTROL CHANNEL PROTOCOLS

(71) Applicant: BROADCOM CORPORATION, Irvine, CA (US)

(72) Inventors: Jeyhan Karaoguz, Irvine, CA (US); John Walley, Ladera Ranch, CA (US); Ahmadreza Rofougaran, Newport Coast, CA (US); Nambirajan Seshadri, Irvine, CA (US); Reinierus Hendricus Maria Van Der Lee, Lake Forest, CA (US)

(73) Assignee: Broadcom Corporation, Irvine, CA (US)

( * ) Notice: Subject to any disclaimer, the term of this patent is extended or adjusted under 35 U.S.C. 154(b) by 187 days.

(21) Appl. No.: 14/144,004

(22) Filed: Dec. 30, 2013

(65) Prior Publication Data

US 2014/0117772 A1    May 1, 2014

Related U.S. Application Data

(63) Continuation of application No. 13/851,164, filed on Mar. 27, 2013, now Pat. No. 8,618,697, which is a continuation of application No. 12/772,203, filed on May 1, 2010, now Pat. No. 8,410,637.

(60) Provisional application No. 61/264,925, filed on Nov. 30, 2009.

(51) Int. Cl.
*H04B 5/00* (2006.01)
*H02J 7/02* (2016.01)
(Continued)

(52) U.S. Cl.
CPC .......... *H04B 5/0037* (2013.01); *G06K 7/10207* (2013.01); *G06K 7/10346* (2013.01); *G06K 19/0701* (2013.01); *G06K 19/0715* (2013.01); *G06K 19/0723* (2013.01); *H02J 7/025* (2013.01); *H02J 17/00* (2013.01); *H04L 29/06163* (2013.01); *H04L 69/18* (2013.01)

(58) Field of Classification Search
CPC ....................................................... H02J 1/00
USPC ....................................................... 307/104
See application file for complete search history.

(56) References Cited

U.S. PATENT DOCUMENTS

2010/0264746 A1\*   10/2010   Kazama .................. H02J 7/025
                                                                    307/104

*Primary Examiner* — Robert Deberadinis
(74) *Attorney, Agent, or Firm* — Garlick & Markison; Bruce E. Garlick

(57) ABSTRACT

A wireless power system includes a wireless power transmit and receive units. The wireless power transmit unit includes a wireless power transmit circuit that generates a wireless power magnetic field and a transmit unit transceiver that transceives a communication regarding the wireless power magnetic field in accordance with a control channel protocol. The wireless power receive unit includes a wireless power receive circuit, a transceiver, and a processing module. The wireless power receive circuit converts the wireless power magnetic field into a voltage. The receive unit processing module is operable to: identify the control channel protocol; determine whether the receive unit transceiver is capable of communication using the control channel protocol; and, when the receive unit transceiver is capable of communication using the control channel protocol, coordinate configuration of the receive unit transceiver to transceive the communication regarding the wireless power magnetic field via the control channel.

20 Claims, 29 Drawing Sheets

(51) Int. Cl.
*G06K 7/10* (2006.01)
*G06K 19/07* (2006.01)
*H02J 17/00* (2006.01)
*H02J 1/00* (2006.01)
*H04L 29/06* (2006.01)

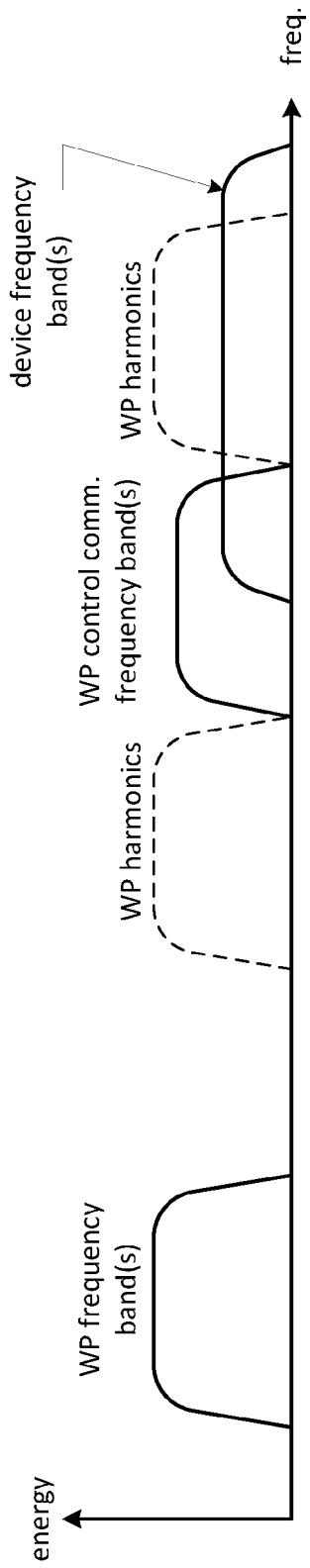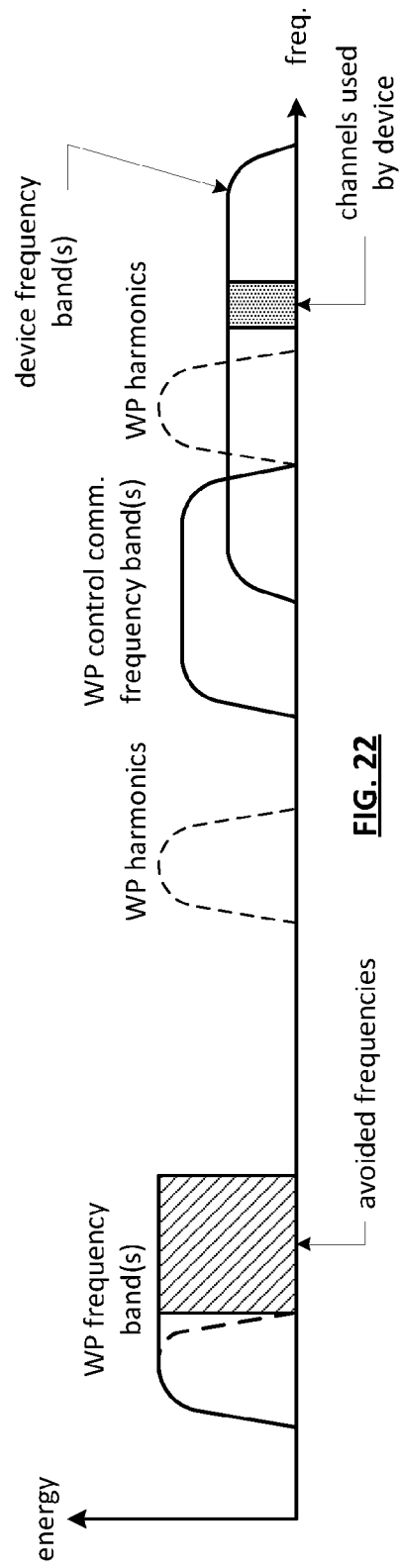

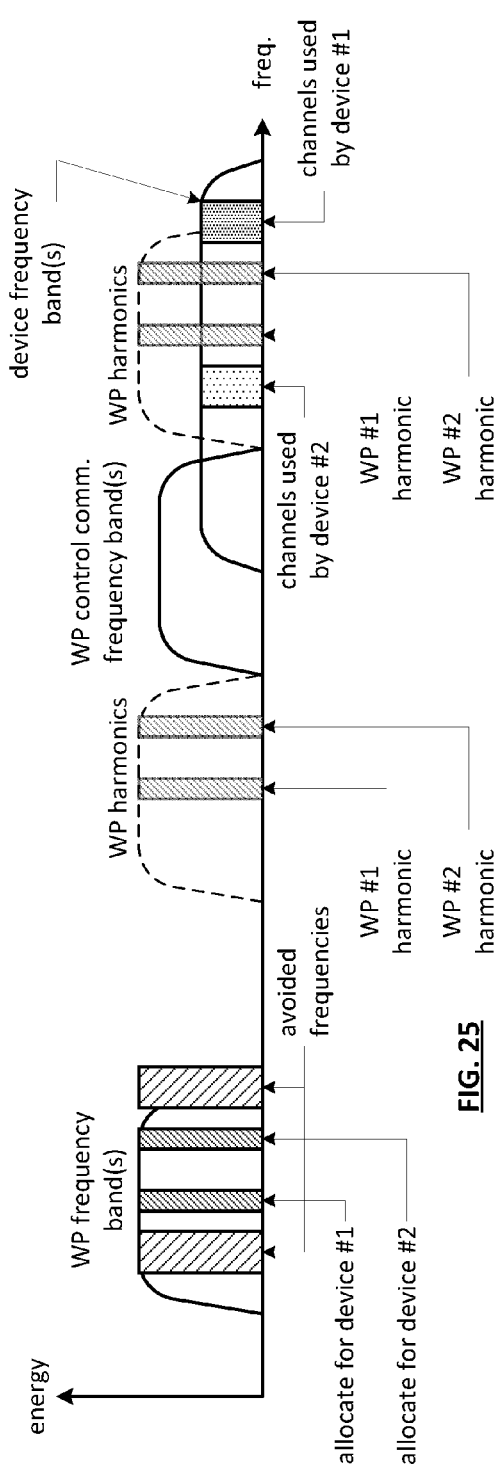
FIG. 25
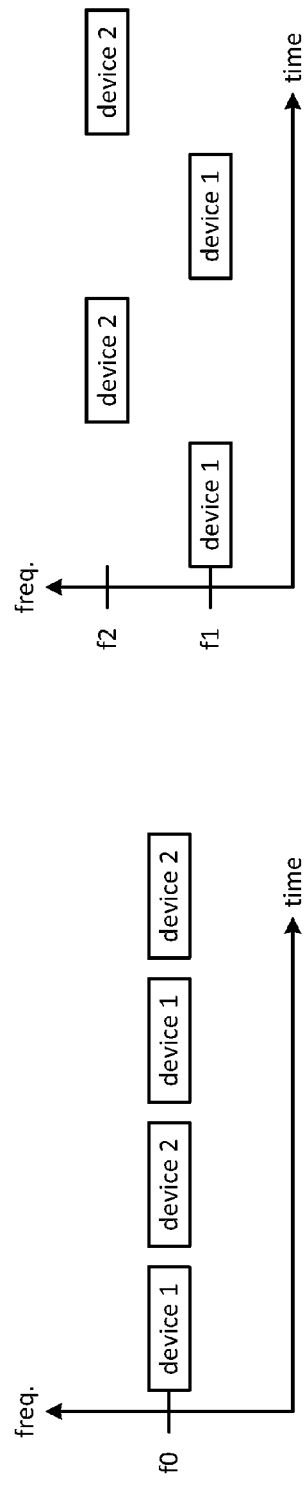
FIG. 27
FIG. 26

WIRELESS POWER SYSTEM WITH SELECTABLE CONTROL CHANNEL PROTOCOLS

The present U.S. Utility Patent Application claims priority pursuant to 35 U.S.C. §120, as a continuation, to the following U.S. Utility Patent which is hereby incorporated herein by reference in its entirety and made part of the present U.S. Utility Patent Application for all purposes:

1. U.S. Utility patent application Ser. No. 13/851,164, entitled "WIRELESS POWER SYSTEM WITH SELECTABLE CONTROL CHANNEL PROTOCOLS," filed Mar. 27, 2013, now issued as U.S. Pat. No. 8,618,697 on Dec. 31, 2013, which claims priority pursuant to 35 U.S.C. §120, as a continuation, to the following U.S. Utility Patent Application which is hereby incorporated herein by reference in its entirety and made part of the present U.S. Utility Patent Application for all purposes:

a. U.S. Utility patent application Ser. No. 12/772,203, entitled "WIRELESS POWER SYSTEM WITH SELECTABLE CONTROL CHANNEL PROTOCOLS," filed May 1, 2010, now issued as U.S. Pat. No. 8,410,637 on Apr. 2, 2013, which claims priority pursuant to 35 U.S.C. §119(e) to U.S. Provisional Patent Application Ser. No. 61/264,925, entitled "WIRELESS POWER SYSTEMS AND METHODS," filed Nov. 30, 2009, now expired, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates to power conversion and more particularly to wireless power conversion and supporting communications thereof.

2. Description of Related Art

The concept of wireless power (i.e., powering a device without an electrical power cord) has been around for a while and has recently been commercialized. In addition, there are a couple of on-going standards discussions (WPC—wireless communication alliance and CEA—consumer electronics association) to standardize wireless power systems.

Current commercially available wireless power products include a transmit unit, a receive unit, and a bidirectional control channel. In these products, the primary method of energy transfer is inductive coupling, but some lower power applications may include solar energy transfer, thermo-electronic energy transfer, and/or capacitive energy transfer. To use these products, the receive unit is a separate unit that must be coupled to a device that is to be wirelessly powered. Thus, the device itself cannot be wirelessly powered without the receive unit coupled to it.

To develop these products, effort has been spent on inductive power transfer, closed loop systems, and multiple load support. In the area of inductive power transfer, effort has been spent on optimizing the tuning the transmit and receive circuits (each of which includes a single inductor) for resonance, efficiency, and/or thermal issues, detecting loads, turning off the inductive power transfer, coil alignment, magnetic alignment, lower phantom power, Class D, E power transmitters with load compensation, antenna design, and coil switching. In the area of multiple load support, effort has been spent on power sharing and tuning, control channel multi-access, and collision avoidance.

In the area of closed loop systems, effort has been spent on regulating the transmit power, the transmit resonance, alignment to maximize safety and/or power transfer using a particular control channel protocol (e.g., backscatter, IrDA, or Bluetooth). As such, as long as the receive unit and transmit unit are from the same vendor using the same communication protocol for the control channel, wireless power transfer can occur. While the above referenced standards organization are attempting to establish standards regarding the control channel protocol, currently, vendors are free to use whatever protocol they chose, making compatibility issues between different vendors' wireless power products.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 21 is a diagram of an example of frequency planning within a wireless power system in accordance with the present invention;

FIG. 22 is a diagram of another example of frequency planning within a wireless power system in accordance with the present invention;

FIG. 25 is a diagram of another example of frequency planning within a wireless power system in accordance with the present invention;

FIG. 26 is a diagram of another example of frequency planning within a wireless power system in accordance with the present invention;

FIG. 27 is a diagram of another example of frequency planning within a wireless power system in accordance with the present invention;

DETAILED DESCRIPTION OF THE INVENTION

Figure 1:
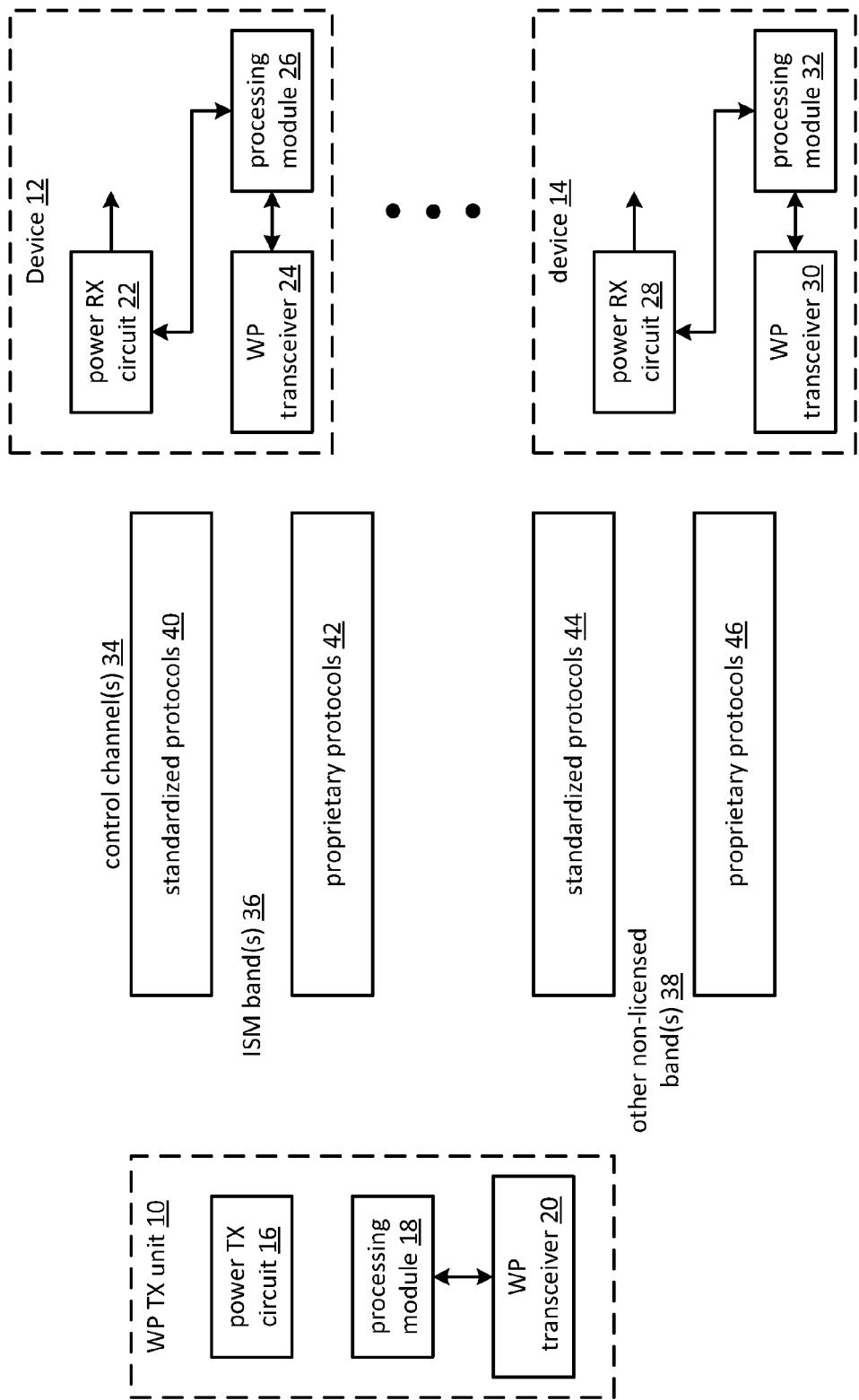
FIG. 1 is a schematic block diagram of an embodiment of a wireless power system in accordance with the present invention.

FIG. 1 is a schematic block diagram of an embodiment of a wireless power system that includes a wireless power (WP) transmit (TX) unit 10 and one or more devices 12-14. The WP TX unit 10 includes a processing module 18, a WP transceiver 20, and a power TX circuit 16. Each device 12-14 includes a WP receive (RX) circuit 22, 28, a processing module 26, 32, and a WP transceiver 24, 30. The device 12-14 will most likely include a plurality of other components depending on its desired functionality. For example, the device 12-14 may be a cell phone, a personal audio/video player, a video game unit, a toy, etc. and includes the corresponding circuitry.

The processing modules 18, 26, 32 of the WP TX unit 10 and in each of the devices 12-14 may each be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 18, 26, 32 may have an associated memory and/or memory element, which may be a single memory device, a plurality of memory devices, and/or embedded circuitry of the processing module 18, 26, 32. Such a memory device may be a read-only memory, random access memory, volatile memory, non-volatile memory, static memory, dynamic memory, flash memory, cache memory, and/or any device that stores digital information. Note that if the processing module 18, 26, 32 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 18, 26, 32 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 18, 26, 32 executes, hard coded and/or operational instructions corresponding to at least some of the steps and/or functions illustrated in FIGS. 1-36.

The WP TX unit 10 communicates with the WP transceivers 24, 30 of the devices 12-14 via one or more control channels 34 that use one or more frequencies in the ISM bands 36 and/or one or more frequencies in another non-licensed frequency band(s) 38. The communication via the control channel 34 may use one or more standardized protocols 40, 44 and/or one or more proprietary protocols 42, 46. For example, the standardized protocols 40, 44 may include Bluetooth (2400 MHz), HIPERLAN (5800 MHz), IEEE 802.11 (2400 MHz and 5800 MHz), and IEEE 802.15.4 (personal area networks using 915 MHz or 2400 MHz).

The ISM bands 36 include:

| Frequency range | Center frequency |
|---|---|
| 6.765-6.795 MHz | 6.780 MHz |
| 13.553-13.567 MHz | 13.560 MHz |
| 26.957-27.283 MHz | 27.120 MHz |
| 40.66-40.70 MHz | 40.68 MHz |
| 433.05-434.79 MHz | 433.92 MHz |
| 902-928 MHz | 915 MHz |
| 2.400-2.500 GHz | 2.450 GHz |
| 5.725-5.875 GHz | 5.800 GHz |
| 24-24.25 GHz | 24.125 GHz |
| 61-61.5 GHz | 61.25 GHz |
| 122-123 GHz | 122.5 GHz |
| 244-246 GHz | 245 GHz |

Each of the WP power transceivers 20, 24, 30 (e.g., in the WP TX unit 10 and in each of the devices 12-14) includes baseband processing (which may be done by the corresponding processing module 18, 26, 32), a radio frequency (RF) and/or a millimeter wave (MMW) transmitter section, and an RF and/or MMW receiver section. In an example of operation, the baseband processing converts outbound data into outbound symbol stream in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), proprietary protocol, etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion.

The transmitter section converts the outbound symbol stream into an outbound RF signal that has a carrier frequency within a given frequency band (e.g., ISM bands 36). In an embodiment, this may be done by mixing the outbound symbol stream with a local oscillation to produce an up-converted signal. One or more power amplifiers and/or power amplifier drivers amplifies the up-converted signal, which may be RF bandpass filtered, to produce the outbound RF signal. In another embodiment, the transmitter section includes an oscillator that produces an oscillation. The outbound symbol stream provides phase information (e.g., $+/-\Delta\theta$ [phase shift] and/or $\theta(t)$ [phase modulation]) that adjusts the phase of the oscillation to produce a phase adjusted RF signal, which is transmitted as the outbound RF signal. In another embodiment, the outbound symbol stream includes amplitude information (e.g., $A(t)$ [amplitude modulation]), which is used to adjust the amplitude of the phase adjusted RF signal to produce the outbound RF signal.

In yet another embodiment, the transmitter section includes an oscillator that produces an oscillation. The outbound symbol provides frequency information (e.g., $+/-\Delta f$ [frequency shift] and/or $f(t)$ [frequency modulation]) that adjusts the frequency of the oscillation to produce a frequency adjusted RF signal, which is transmitted as the outbound RF signal. In another embodiment, the outbound symbol stream includes amplitude information, which is used to adjust the amplitude of the frequency adjusted RF signal to produce the outbound RF signal. In a further embodiment, the transmitter section includes an oscillator that produces an oscillation. The outbound symbol provides amplitude information (e.g., $+/-\Delta A$ [amplitude shift] and/or $A(t)$ [amplitude modulation]) that adjusts the amplitude of the oscillation to produce the outbound RF signal.

The receiver section receives and amplifies an inbound RF signal to produce an amplified inbound RF signal. The receiver section may then mix in-phase (I) and quadrature (Q) components of the amplified inbound RF signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., $+/-\Delta\theta$ [phase shift] and/or $\theta(t)$ [phase modulation]) and/or frequency information (e.g., $+/-\Delta f$ [frequency shift] and/or $f(t)$ [frequency modulation]). In another embodiment and/or in furtherance of the preceding embodiment, the inbound RF signal includes amplitude information (e.g., $+/-\Delta A$ [amplitude shift] and/or $A(t)$ [amplitude modulation]). To recover the amplitude information, the receiver section includes an amplitude detector such as an envelope detector, a low pass filter, etc.

The baseband processing converts the inbound symbol stream into inbound data (e.g., control channel data) in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), proprietary protocol, etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling.

The WP TX unit 10 communicates with the devices 12-14 via the control channel to facilitate efficient wireless power transfer from the WP TX unit 10 to the power RX circuit 22, 28 of the devices 12-14. For example, the communication may be to determine which frequency to use, to reposition the device 12-14 to improve magnetic coupling, to tune the components of the power TX circuit 16 and/or the power RX circuit 22, 28, to indicate desired power levels, to adjust power levels, etc. As such, during the wireless transfer of energy from the power TX circuit 16 to the power RX circuit 22, 28 of one or more devices 12-14, the WP TX unit 10 and the devices 12-14 communicate to provide a desired performance level of wireless energy transfer.

In another example of operation, the receive unit processing module 26, 32 functions to identify the control channel protocol used by the wireless power transmit unit 10 for control channel communications. Note that the control channel includes one of a plurality of control channel protocols that includes at least one or more standard control channel protocols and/or one or more proprietary control channel protocols. Further note that the transmit unit transceiver 20 uses one of the control channel protocols and is capable of using a subset of the plurality of control channel protocols. For instance, one transmit unit transceiver 20 may use a Bluetooth protocol or a proprietary protocol for its control channel protocol, while another transmit unit transceiver 20 of another wireless power transmit unit 10 may use a different control channel protocol. As such, the receive unit needs to identify the control channel protocol.

The receive unit processing module 26, 32 may identify the control channel protocol by interpreting a beacon signal transmitted by the transmit unit transceiver to determine the control channel protocol. Alternatively, or in addition to the preceding example, the receive unit processing module 26, 32 may identify the control channel protocol by receiving a set-up communication from the transmit unit transceiver 20 using a default control channel protocol. As another alternative, or in addition to one or more of the preceding examples, the receive unit processing module 26, 32 may identify the control channel protocol by scanning a frequency spectrum for control channel activity to produce scanned frequency spectrum and identify the control channel protocol from the scanned frequency spectrum. As yet another alternative, or in addition to one or more of the preceding examples, the receive unit processing module 26, 32 may identify the control channel protocol by evoking a trial and error system using known control channel protocols.

When the receive unit processing module 26, 32 identifies the control channel protocol, it determines whether the receive unit transceiver is capable of communication using the control channel protocol. For example, the processing module is determining whether the receive unit transceiver 24, 30 be configured to support the control channel protocol. When the receive unit transceiver 24, 30 is capable of communication using the control channel protocol, the processing module coordinates configuration of the receive unit transceiver to transceive the communication regarding the wireless power magnetic field via the control channel. Configuring of the receive unit transceiver 24, 30 is discussed in greater detail with reference to FIG. 6.

As yet another alternative to identifying the control channel protocol, the transmit unit transceiver 20 and the receive unit transceiver 24, 30 may negotiate which control channel protocol to use. For example, the transmit unit transceiver may transceive negotiation information (e.g., what protocols they each support, desired data rate, available bandwidth, etc.) with the receive unit transceiver to mutually select the control channel protocol.

If the processing module 26, 32 cannot identify the control channel or the receive unit transceiver 24, 30 is not capable of being configured to use the control channel protocol, the processing module determines whether the receive unit transceiver is lacking hardware or lacking software to support the control channel protocol. When the receive unit transceiver is lacking software, the processing module generates a network message to download the software to support the control channel protocol. Once the software is downloaded, the receive unit transceiver 24, 30 is configured to support the control channel protocol.

With the control channel established between the wireless power transmit unit 10 and the device 12, 14, the wireless power transmit circuit 16 generates a wireless power magnetic field in accordance with the control channel data (e.g., power level, frequency, tuning, etc.). The wireless power receive circuit 22, 28 converts the wireless power magnetic field into a voltage, which may be used to charge a battery of the device and/or to power at least a portion of the device 12, 14.

Figure 2:
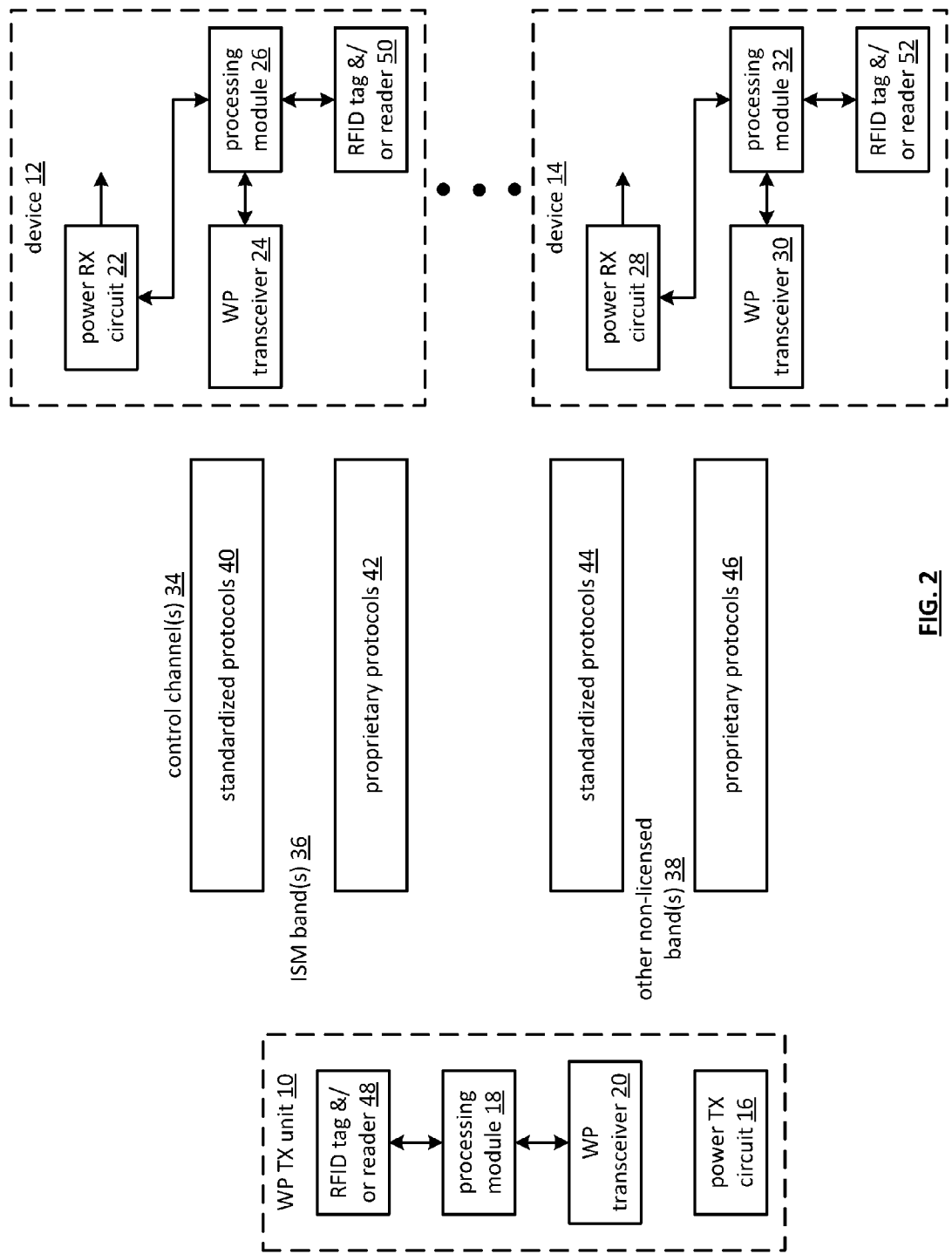
FIG. 2 is a schematic block diagram of another embodiment of a wireless power system in accordance with the present invention.

FIG. 2 is a schematic block diagram of another embodiment of a wireless power system that includes a wireless power (WP) transmit (TX) unit 10 and one or more devices. The WP TX unit 10 includes a processing module 18, a WP transceiver 20, an RFID (radio frequency identification) tag and/or reader 48, and a power TX circuit 16. Each device 12-14 includes a WP receive (RX) circuit 24, 28, a processing module 26, 32, an RFID tag and/or reader 50, 52, and a WP transceiver 24, 30. The device 12-14 will most likely include a plurality of other components depending on its desired functionality. For example, the device may be a cell phone, a personal audio/video player, a video game unit, a toy, etc. and it includes the corresponding circuitry.

In this embodiment, the RFID tags 48, 50, 52 include information regarding the wireless power requirements and capabilities of the devices 12-14 and of the WP TX unit 10. For instance, the information may include the communication protocol to use (e.g., one or more of the standardized protocols 40, 44 or one or more of the proprietary protocols 42, 46), the wireless power frequency spectrum, impedance matching information, battery charging requirements, etc. The RFID readers and tags 48, 50, 52 may be active or passive devices and may use backscattering to communicate. As such, the devices 12-14 initially communicate with the WP TX unit 10 to exchange set up information and, once set up, the devices 12-14 communicate with the WP TX unit 10 via the WP transceivers 20, 24, 30.

Figure 3:
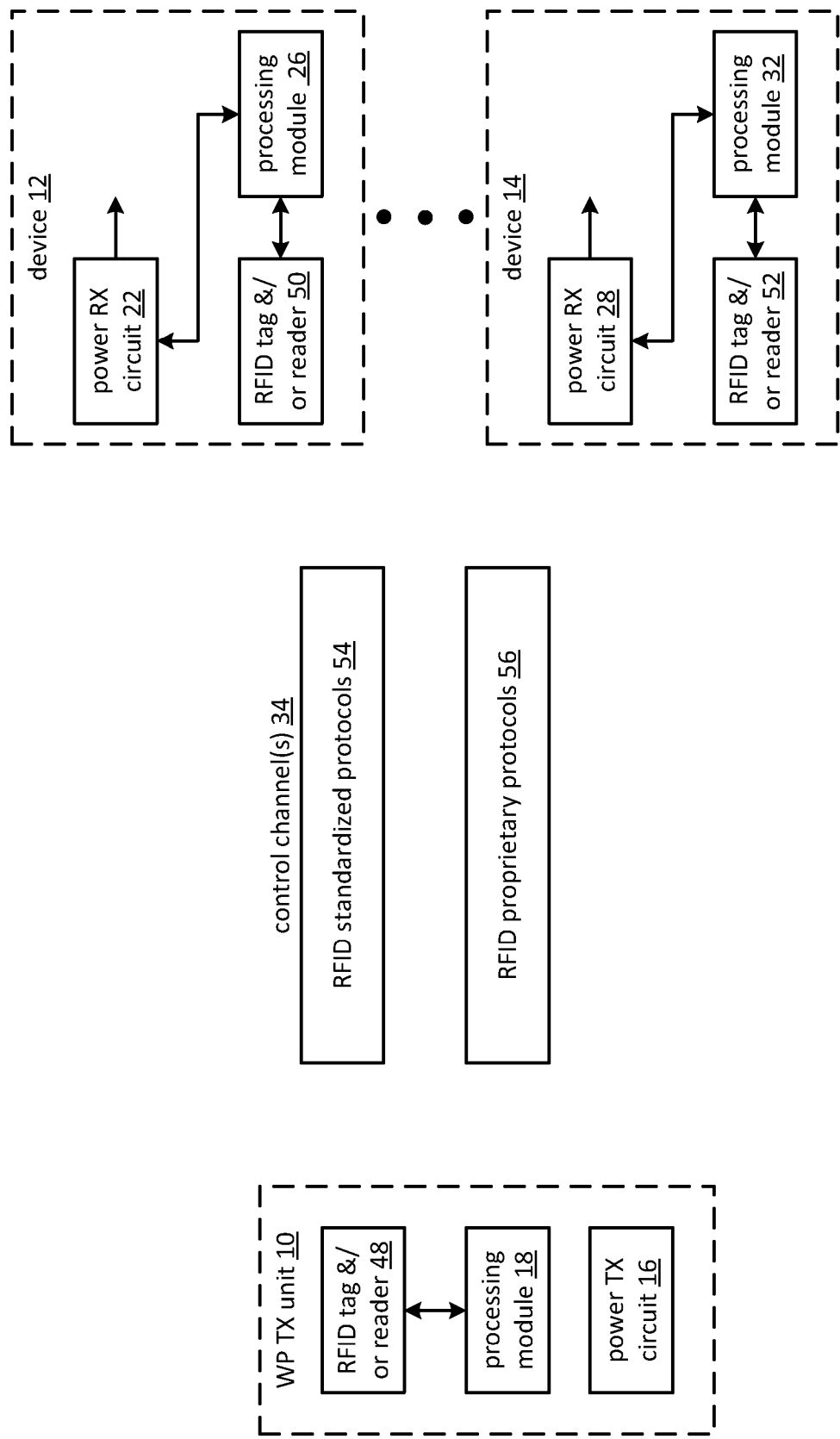
FIG. 3 is a schematic block diagram of another embodiment of a wireless power system in accordance with the present invention.

FIG. 3 is a schematic block diagram of another embodiment of a wireless power system that includes a wireless power (WP) transmit (TX) unit 10 and one or more devices 12-14. The WP TX unit 10 includes a processing module 18, an RFID (radio frequency identification) tag and/or reader 48, and a power TX circuit 16. Each device 12-14 includes a WP receive (RX) circuit 22, 28, a processing module 26, 32, and an RFID tag and/or reader 50, 52. The device 12-14 will most likely include a plurality of other components depending on its desired functionality. For example, the device may be a cell phone, a personal audio/video player, a video game unit, a toy, etc. and it includes the corresponding circuitry.

In this embodiment, the RFID tags 48, 50, 52 include information regarding the wireless power requirements and capabilities of the devices 12-14 and of the WP TX unit 10. For instance, the information may include the communication protocol to use (e.g., one or more of the standardized protocols 54 or one or more of the proprietary protocols 56), the wireless power frequency spectrum, impedance matching information, battery charging requirements, etc. In addition to exchanging set up information, the WP TX unit 10 and the devices 12-14 use the RFID tags and readers 48, 50, 52 as the primary communication means between them. Note that the RFID readers and tags 48, 50, 52 may be active or passive devices and may use backscattering to communicate.

Figure 4:
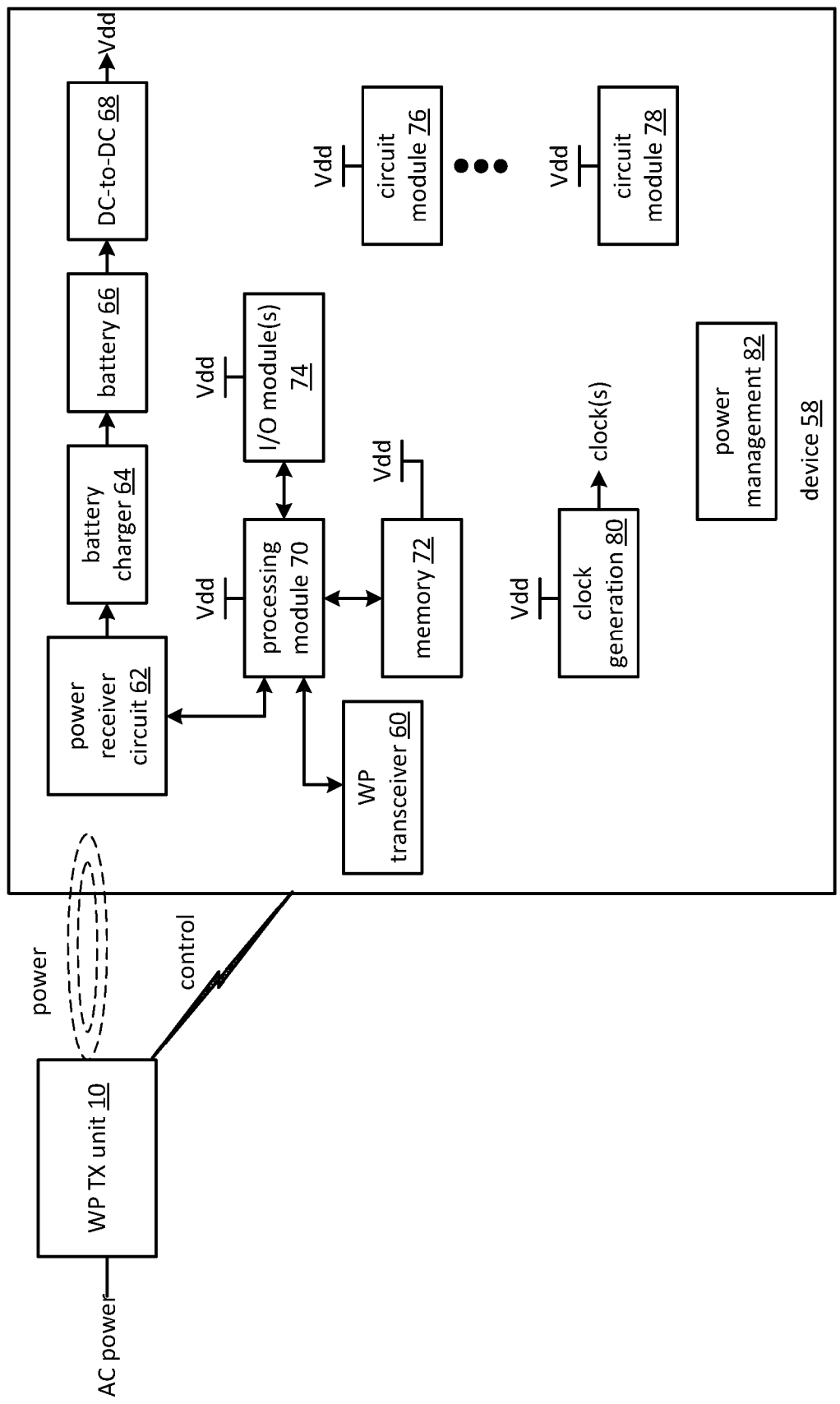
FIG. 4 is a schematic block diagram of another embodiment of a wireless power system in accordance with the present invention.

FIG. 4 is a schematic block diagram of another embodiment of a wireless power system that includes the WP TX unit 10 and a device 58. The device 58 includes the power receiver circuit 62, a battery charger 64, a battery 66, a DC-to-DC converter 68, the processing module 70, memory 72, a plurality of input/output (I/O) modules 74, a plurality of circuit modules 76-78, a clock generation unit 80, and a power management unit 82. Note that the device 58 may be one of the devices 12-14 of FIGS. 1-3.

In an example of operation, after the WP TX unit 10 and the device 58 have established communication, the WP TX unit 10 generates a magnetic field that is received by the power receiver circuit 62, which is integrated into device 58. This will be discussed in greater detail with reference to one or more of the subsequent figures. The power receiver circuit 62 generates an AC voltage from the magnetic field, rectifies the AC voltage to produce a rectified voltage, and filters to the rectified voltage to produce a DC voltage rail (e.g., V+ and V−). The power receiver circuit 62 may be tuned based on control signals provided by the processing module 70, where the processing module generates the control signal(s) based on desired electromagnetic properties of the received magnetic field and/or of the integrated power receive circuit 62. For example, the desired electromagnetic properties of the received magnetic field may include frequency, interference avoidance, and/or magnetic coupling and the desired electromagnetic properties of the integrated power receive circuit may include tuning, quality factor, impedance matching, current limiting, and power level.

The battery charger 64 converts the DC voltage rail into a battery charge voltage, which it provides to the battery 66. The battery charger 64 monitors the charging to insure proper charging in accordance with the type of battery and, once the battery 66 is charged, may implement a trickle charge. Note that the processing module 70 may provide control signals to the battery charger 64 to regulate the charging in accordance with the type of battery.

The DC-to-DC converter 68 converts the battery voltage (e.g., 1.5 volts, 4.2 volts, etc.) into one or more supply voltages (e.g., 1 volt, 2.2 volts, 3.3 volts, 5 volts, 12 volts, etc.). The DC-to-DC converter 68 provides the supply voltages to one or more of the other modules 70, 72, 74, 76, 78, 80 under the direction of the power management module 82. In general, the power management module 82 functions to control power consumption by the device 58 to an optimal level (e.g., balancing of performance and battery life). In this regard, the power management module 82 may treat each module 70, 72, 74, 76, 78, 80 as a separate power island that can be individually controlled. For example, when a circuit module 76-78 is inactive, the power management module 82 may remove power from the circuit module 76-78. As another example, the power management module 82 may reduce the voltage provided to a circuit module 76-78 when the circuit module 76-78 does not need to operate at its maximum potential.

In addition to controlling the supply voltage to each power island, the power management module 82 may control the clock signals provided to each circuit module 76-78 that uses a clock signal. For example, when a circuit is idle, the power management module 82 may provide a reduced supply voltage to the circuit module 76-78, but disable the clock signal provided to the circuit module 76-78. In this way, minimal power is consumed, but the circuit module 76-78 may be quickly activated when it is needed. As another example, the power management module 82 may reduce the frequency of a clock signal for a circuit module 76-78 when the circuit module 76-78 does not need to operate at its maximum potential.

The plurality of circuit modules 76-78 provides at least some of the functionality for the device 58. For example, if the device is a cell phone, the circuit modules 76-78 may provide a digital image capture function, a digital image display function, an audio file playback function, a data messaging function, a voice call function, etc. The plurality of input/output (I/O) modules 74 provides the interface to the user input/output components (e.g., speaker, microphone, display, buttons, etc.) of the device 58. For example, a circuit module may generate outbound data (e.g., a captured digital image). The processing module processes the outbound data to produce processed data (e.g., generates a digital image file) and provides the processed outbound data to an input/output module for display on a peripheral output component (e.g., an LCD display). As another example, an input/output module may receive inbound data (e.g., a place call command) from a peripheral input component (e.g., keypad of the device) and provide it to the processing module. The processing module processes the inbound data to produce processed inbound data (e.g., retrieve the phone number of the target identified in the call command). The processing module provides the processed inbound data to a circuit module, which performs a function on the processed inbound data (e.g., places the call to the target).

Figure 5:
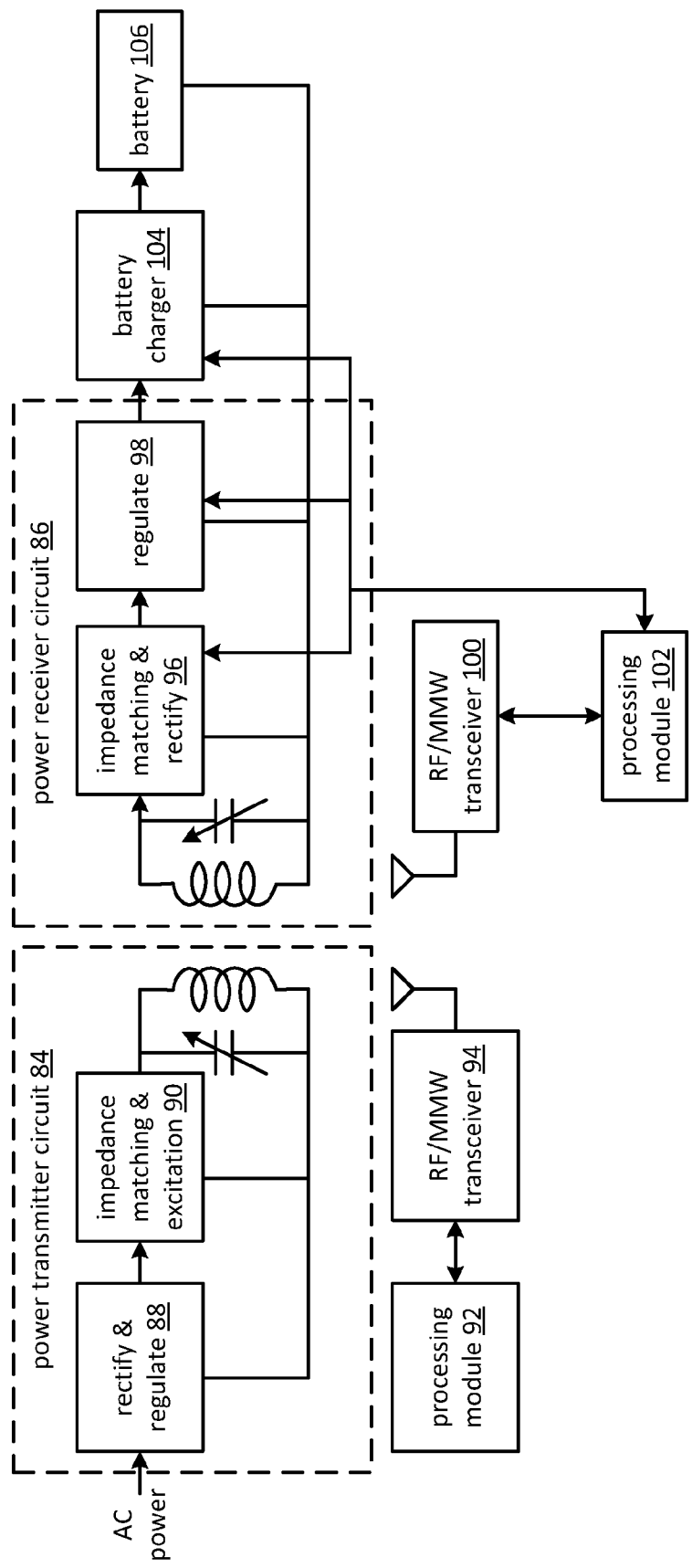
FIG. 5 is a schematic block diagram of another embodiment of a wireless power system in accordance with the present invention.

FIG. 5 is a schematic block diagram of an embodiment of a portion of a wireless power system that includes the power transmitter circuit 84 and the power receiver circuit 86. The power transmitter circuit 84 includes a coil (i.e., an inductor), a rectify and regulate circuit 88, an impedance matching and excitation circuit 90, a processing module 92, and an RF and/or MMW transceiver 94. The power receiver circuit 86 includes a coil, an impedance matching and rectify circuit 96, a regulate circuit 98, and an RF and/or MMW transceiver 100. The power receiver circuit 86 is coupled to the battery charger 104 and the processing module 102. In this regard, the power receiver circuit 84 is readily integrated into the device and uses components of the device (e.g., the processing module 102). As such, the power receiver circuit 86 is not a standalone component coupled to the device, but an integral part of the device. Note that the device 12,14, 58 will typically include a housing, which houses the power receiver circuit 86, the battery charger 104, the battery 106, and the RF/MMW transceiver 100, the processing module 102, and the components as shown in FIG. 4.

In an example of operation, the rectify and regulate circuit of the power transceiver circuit 84 converts an AC voltage (e.g., 110 VAC, 220 VAC, etc.) into a DC voltage (e.g., 160 VDC, 320 VDC, etc.). The impedance matching and excitation circuit 90 couple the TX power coil to the DC voltage in an alternating pattern (e.g., a full bridge inverter, a half bridge inverter) at a given frequency (e.g., 10 MHz, etc.). The impedance matching allows the LC circuit of the capacitor and coil to be tuned to a desired resonant frequency and to have a desired quality factor. For example, the LC circuit may be tuned to resonant at the excitation rate.

The coil of the power RX 86 unit is proximal to the coil of the TX unit 84 to receive the magnetic field created by the TX coil and to create an AC voltage therefrom. The LC circuit of the RX coil and capacitor may be tuned to have a desired resonance and/or a desired quality factor. The impedance matching and rectify circuit 96 rectifies the AC voltage of the RX coil to produce a DC rail voltage that is regulated via the regulation circuit. The remainder of the diagram functions as previously discussed and/or as will be subsequently discussed.

Figure 6:
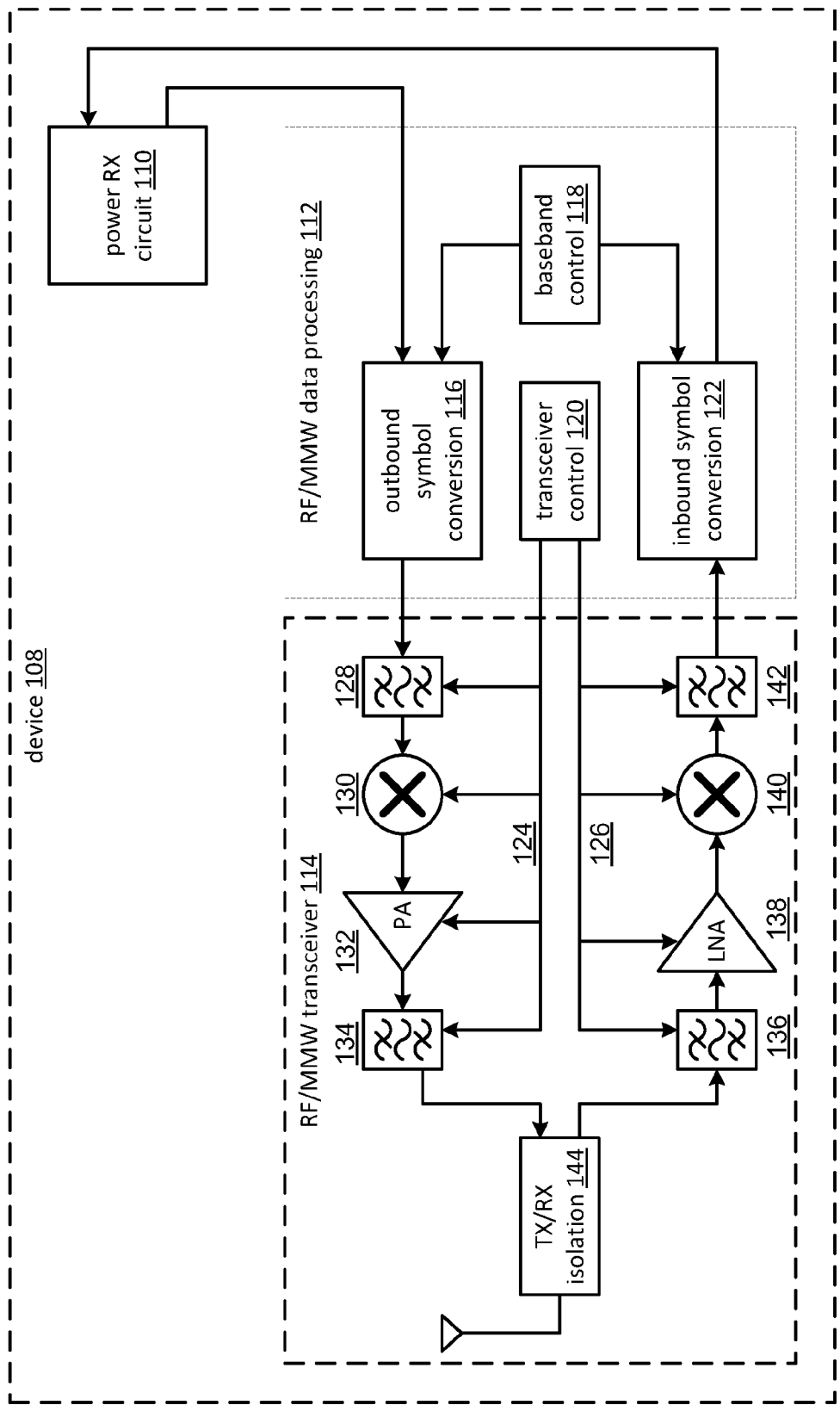
FIG. 6 is a schematic block diagram of an embodiment of a wirelessly powered device in accordance with the present invention.

FIG. 6 is a schematic block diagram of an embodiment of a wirelessly powered device 108 that includes the power RX circuit 110, an RF and/or MMW data processing module 112 (which may be implemented within the processing module) and the RF and/or MMW transceiver 114. The RF and/or MMW data processing module 112 includes an outbound symbol conversion module 116, a baseband control module 118, a transceiver control module 120, and an inbound symbol conversion module 122. The RF and/or MMW transceiver 114 includes a transmitter 124 and a receiver 126. The transmitter 124 includes a low IF (e.g., 0 to a few MHz) bandpass filter 128, a mixing module 130, a power amplifier (PA) 132, and an RF bandpass filter 134. The receiver 126 includes an RF bandpass filter 136, a low noise amplifier (LNA) 138, a mixing module 140, and a low IF bandpass filter 142. If the transmitter 124 and receiver 126 share an antenna, the transceiver 114 further includes a TX/RX isolation circuit 144 (e.g., a circulator, a transformer balun, a TX/RX switch, etc.).

In an example of operation, the data processing module 112 configures itself based on the communication protocol being implemented and the corresponding data modulation. In addition, the transceiver control module provides control signals to the transceiver 114 to adjust one or more of the components thereof based on the protocol being implemented. In this regard, the data processing module 112 and the transceiver 114 may be configured to implement one or more of the standard communication protocols and/or one or more of the proprietary communication protocols. Note that the device 108 may include one or more configurable RF/MMW data processing modules 112 and/or one or more configurable RF/MMW transceivers 114.

Figure 7:
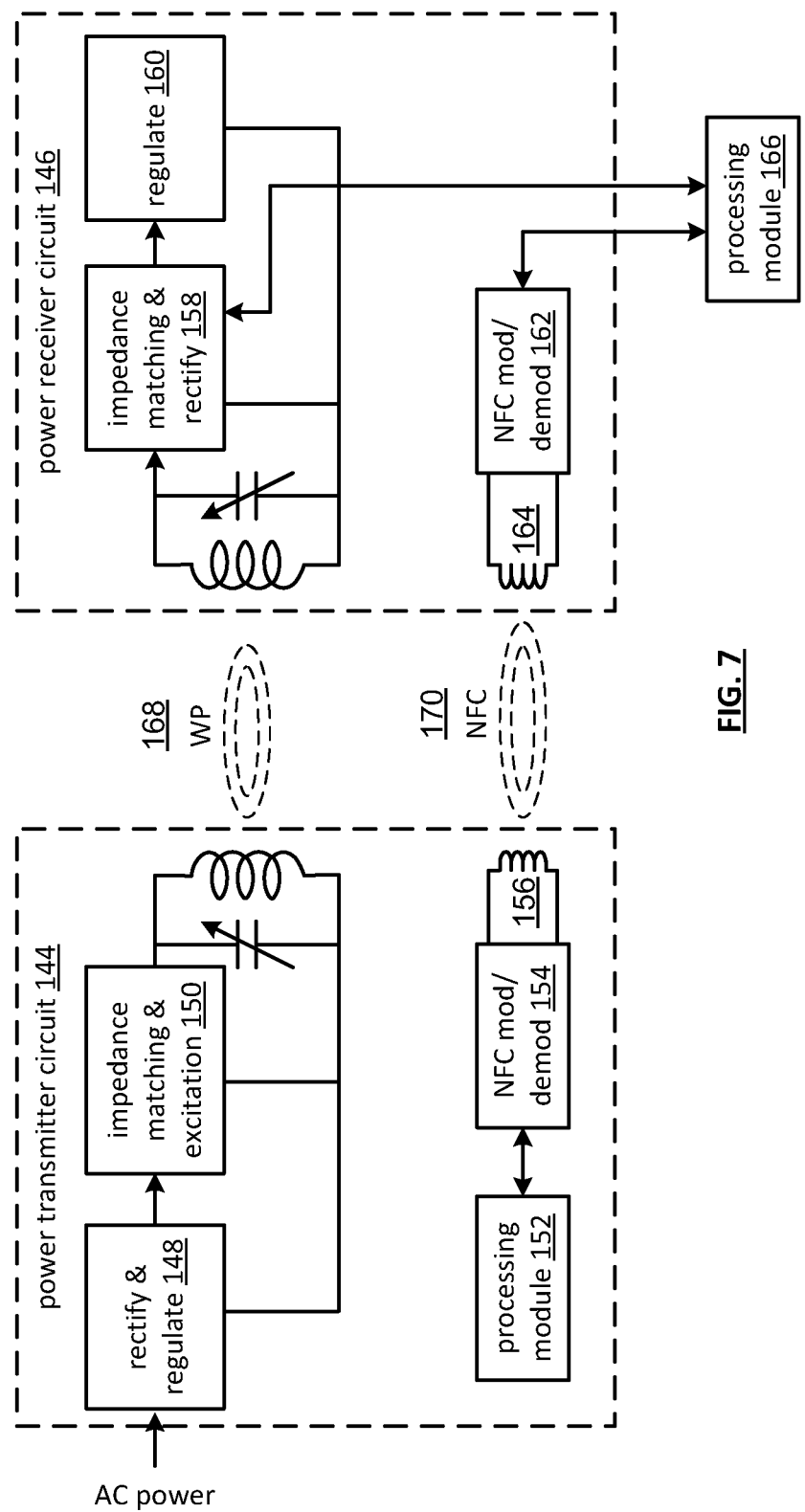
FIG. 7 is a schematic block diagram of an embodiment of a portion of a wireless power system in accordance with the present invention.

FIG. 7 is a schematic block diagram of an embodiment of a portion of a wireless power system that includes the power transmitter circuit 144 and the power receiver circuit 146. The power transmitter circuit 144 includes a rectify and regulate circuit 148, an impedance matching and excitation circuit 150, a processing module 152, an NFC modulator/demodulator 154, and an NFC coil 156. The power receiver circuit 146 includes an impedance matching and rectify circuit 158, a regulate circuit 160, an NFC modulator/demodulator 162, and an NFC coil 164. The power receiver circuit 146 is coupled to the battery charger (not shown in figure) and the processing module 166.

In an example of operation, the rectify and regulate circuit 148 of the power transmitter circuit 144 converts an AC voltage (e.g., 110 VAC, 220 VAC, etc.) into a DC voltage (e.g., 160 VDC, 320 VDC, etc.). The impedance matching and excitation circuit 150 couple the TX power coil to the DC voltage in an alternating pattern (e.g., a full bridge inverter, a half bridge inverter) at a given frequency (e.g., 10 MHz, etc.). The impedance matching allows the LC circuit of the capacitor and coil to be tuned to a desired resonant frequency and to have a desired quality factor. For example, the LC circuit may be tuned to resonant at the excitation rate.

The coil of the power receiver circuit 146 is proximal to the coil of the transmitter circuit 144 to receive the magnetic field created by the TX coil and to create an AC voltage therefrom. The LC circuit of the RX coil and capacitor may be tuned to have a desired resonance and/or a desired quality factor. The impedance matching and rectify circuit 158 rectifies the AC voltage of the RX coil to produce a DC rail voltage that is regulated via the regulation circuit 160.

The device communicates to the power transmitter circuit 144 via NFC (near field communication) 170. For example, when the device has data to convey to the power transmitter circuit 144, the processing module 166 generates the data, which it provides to the NFC modulator/demodulator 162. The NFC mod/demodulator 162 modulates the data at a given frequency (e.g., 13 MHz, 900 MHz, etc.) that drives the NFC coil 164. The NFC coil 164 creates a magnetic field that is received by the NFC coil 156 of the power transmitter circuit 144. The NFC mod/demod unit 154 demodulates the signal produced by the NFC coil 156 to recover the transmitted data, which is provided to the processing module 152. Data from the power transmitter circuit 144 to the device is processed in a similar manner.

Figure 8:
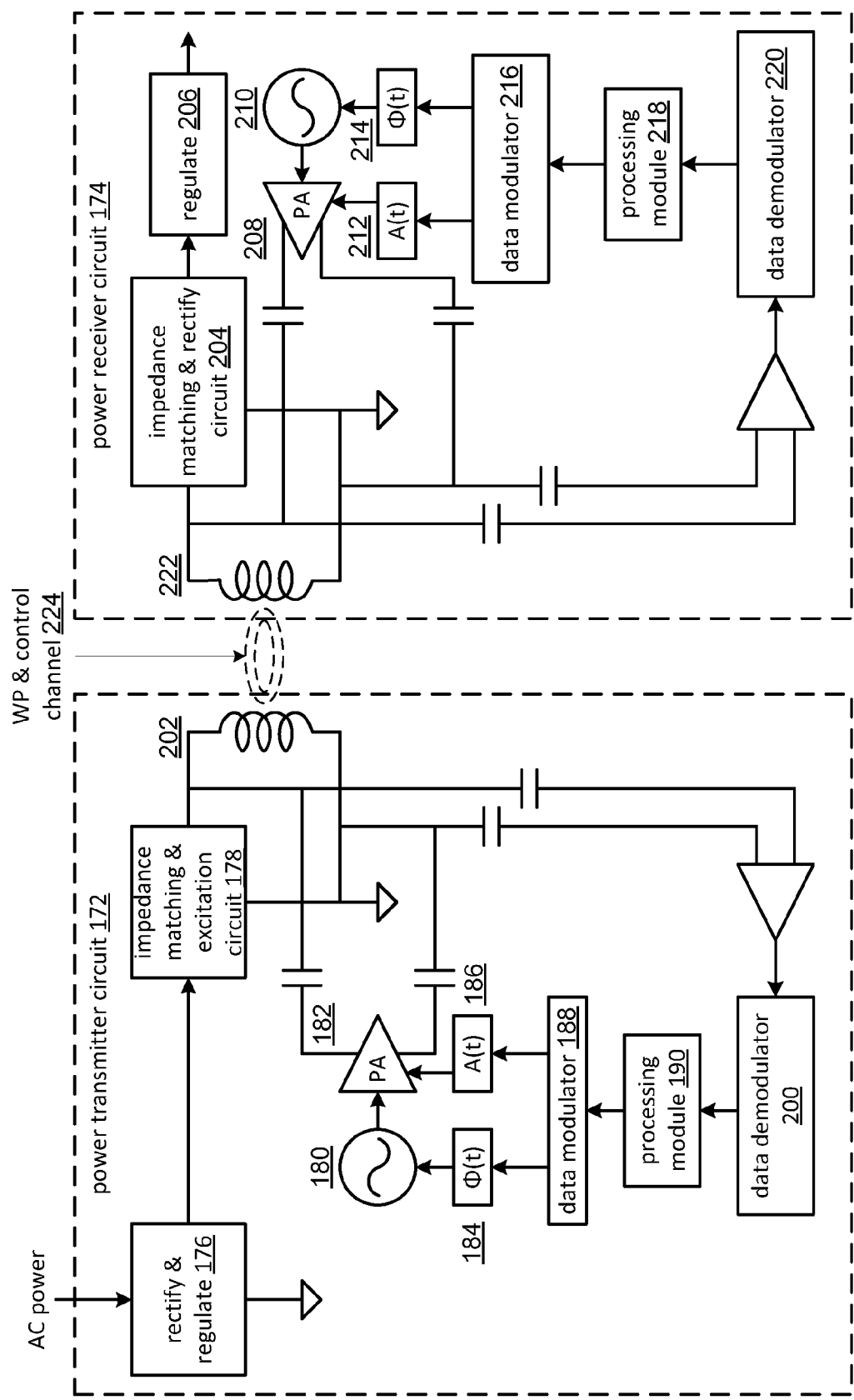
FIG. 8 is a schematic block diagram of another embodiment of a portion of a wireless power system in accordance with the present invention.

FIG. 8 is a schematic block diagram of another embodiment of a portion of a wireless power system that includes the power transmitter circuit 172 and the power receiver circuit 174. The power transmitter circuit 172 includes a rectify and regulate circuit 176, an impedance matching and excitation circuit 178, a processing module 190, an NFC modulator/demodulator 188, 200, and a share WP & NFC coil 202. The power receiver circuit 174 includes an impedance matching and rectify circuit 204, a regulate circuit 206, an NFC modulator/demodulator 216, 220, and an NFC coil 222. The power receiver circuit 174 is coupled to the battery charger (not shown in figure) and the processing module 218.

In an example of operation, the rectify and regulate circuit 176 of the power transmitter circuit 172 converts an AC voltage (e.g., 110 VAC, 220 VAC, etc.) into a DC voltage (e.g., 160 VDC, 320 VDC, etc.). The impedance matching and excitation circuit 178 couple the TX power coil 202 to the DC voltage in an alternating pattern (e.g., a full bridge inverter, a half bridge inverter) at a given frequency (e.g., 10 MHz, etc.). The impedance matching allows the LC circuit of the capacitor and coil to be tuned to a desired resonant frequency and to have a desired quality factor. For example, the LC circuit may be tuned to resonant at the excitation rate.

The coil 202 of the power receiver circuit 174 is proximal to the coil 222 of the power transmitter circuit 172 to receive the magnetic field created by the TX coil 202 and to create an AC voltage therefrom. The LC circuit of the RX coil 222 and capacitor may be tuned to have a desired resonance and/or a desired quality factor. The impedance matching and rectify circuit 204 rectifies the AC voltage of the RX coil 222 to produce a DC rail voltage that is regulated via the regulation circuit.

The device communicates with the WP TX unit via NFC (near field communication) using the shared WP & NFC coils 202, 222. For example, when the device has data to convey to the WP TX unit, the processing module 218 generates the data, which it provides the NFC data modulator 216. The NFC modulator 216 modulates the data at a given frequency (e.g., 13 MHz, 900 MHz, etc.) to produce an amplitude component (A(t)) 212 and a phase component (Φ(t)) 214. The phase component 214 adjusts the phase of an oscillation (cos ω(t)) to produce a phase adjusted oscillation (cos(ω(t)+Φ(t))) 210. The power amplifier 208 amplifies the phase adjusted oscillation 210 by the amplitude component 212 to produce an amplitude modulated and phase adjusted signal (A(t) cos (ω(t)+Φ(t))). The signal is AC coupled to the shared WP & NFC coil 222 for conveyance to the WP TX unit.

The shared coil 202 of the WP TX unit receives the signal (e.g., $A_0 \cos(\omega_0(t))*A(t)\cos(\omega(t)+\Phi(t))$, where $A_0$ is the amplitude of the WP signal and $\omega_0$ corresponds to the frequency of the WP signal). The NFC signal component is AC coupled to the data demodulator 200 and the WP component is provided to the impedance matching circuit 178. The data demodulator 200 recovers the data from the amplitude component 186 and the phase component 184 and provides the data to the processing module 190.

Figure 9:
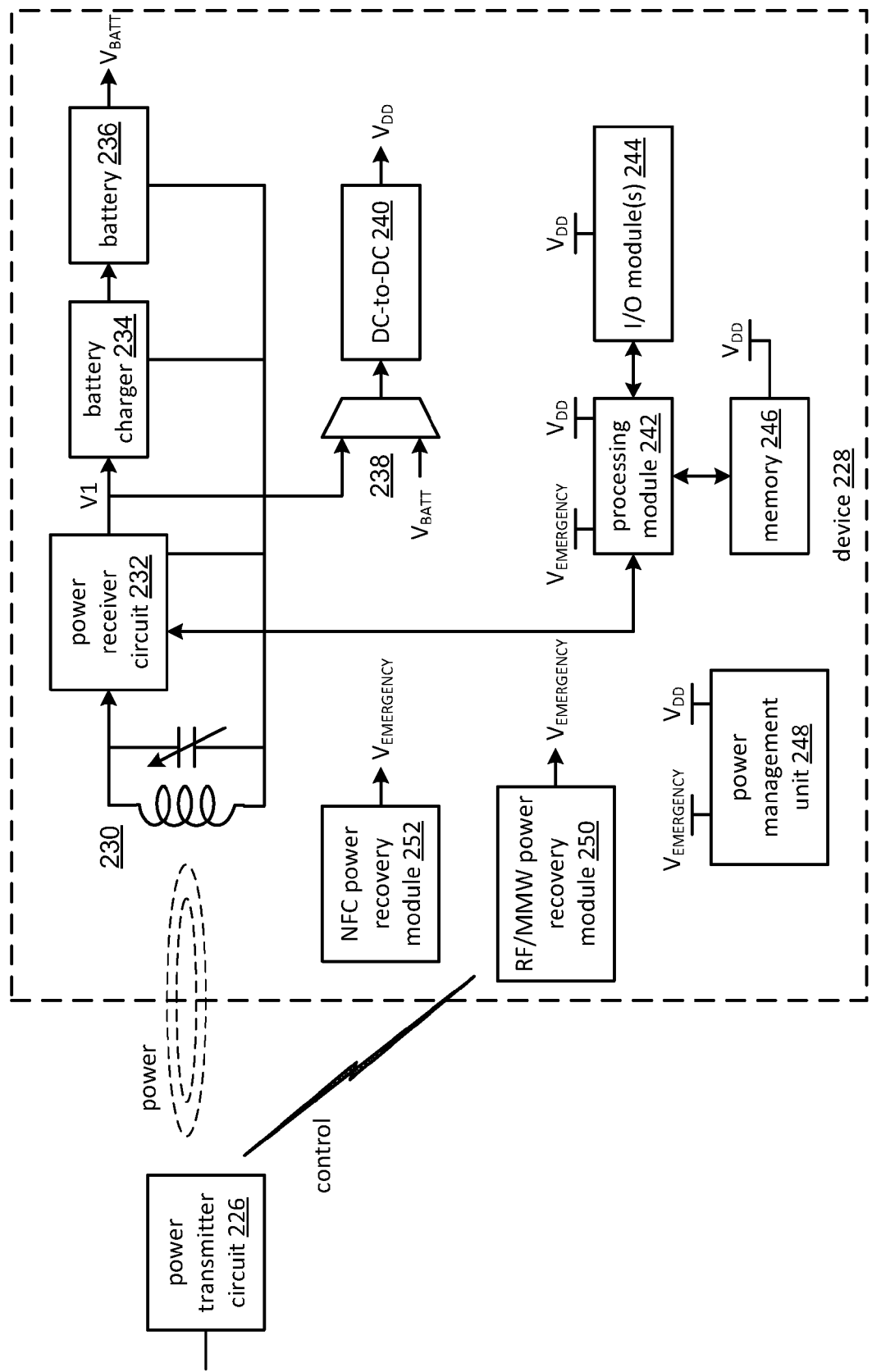
FIG. 9 is a schematic block diagram of another embodiment of a wireless power system in accordance with the present invention.

FIG. 9 is a schematic block diagram of another embodiment of a wireless power system that includes the WP TX unit 226 and a device 228. The device 228 includes the WP coil 230, the power RX circuit 232, the battery charger 234, the battery 236, a multiplexer 238 or the like, the DC-to-DC converter 240, the processing module 242, the IO interface modules 244, the memory 246, the power management unit 248, an NFC power recovery module 252, and/or an RF/MMW power recovery module 250.

In an example of operation, when the battery 236 is dead or near dead and as insufficient power to power minimal circuitry to facilitate battery charging, the NFC power recovery module 252 and/or RF/MMW power recovery module 250 generate an emergency voltage to provide the energy to initiate battery charging. Once energy is being received from the WP TX unit 226, the emergency supply generators may be disabled and the supply voltage V1 may be used to power the device 228 during charging and/or after charging is complete (i.e., in a trickle charge mode). Note that as long as WP energy is being received, the device 228 may be powered by V1 or another voltage derived from the WP energy.

Figure 10:
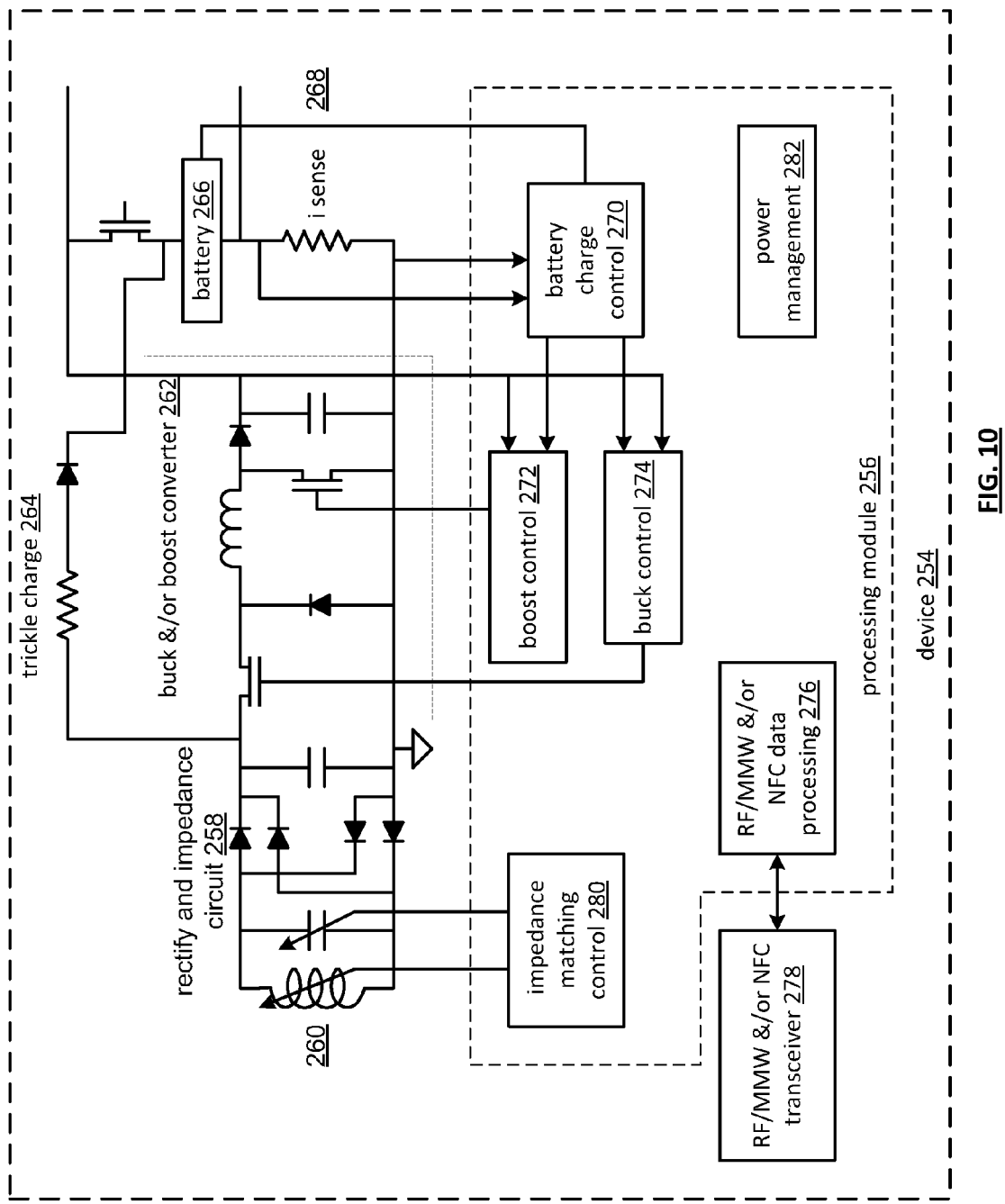
FIG. 10 is a schematic block diagram of another embodiment of a wirelessly powered device in accordance with the present invention.

FIG. 10 is a schematic block diagram of another embodiment of a wirelessly powered device 254 that includes the processing module 256, the rectify and impedance matching circuit (e.g., capacitors and diodes) 258, the RX coil 260, a buck &/or boost converter 262, a trickle charge circuit 264, a battery 266, and a battery current sensor 268. The processing module 256 implements a battery charger controller 270, a boost controller 272, a buck controller 274, an impedance matching control 280, and an RF/MMW and/or NFC data processing module 276. The processing module 256 may further implement the power management unit 282. Note that the processing module 256 may be fabricated on a single integrated circuit or on a multiple integrated circuit with one or more of the components of the converter 262, the rectifier circuit 258, the trickle charge circuit 264, and/or the battery current sense 268.

In an example of operation, the RX coil 260 (which may include one or more adjustable inductors) receives a magnetic field from the WP TX unit and creates an AC voltage therefrom. The adjustable capacitor is tuned (alone in conjunction with the RX coil 260) to a desired resonance, impedance, and/or quality factor to facilitate the creation of the AC voltage. The full bridge rectifier (e.g., the diodes) rectify the AC voltage to produce a rectified voltage that is filtered by the capacitor to produce a DC rail voltage (e.g., 3-20 volts).

The buck and/or boost converter 262 is enabled in a buck converter mode when the DC voltage rail is to be stepped down to produce battery charge voltage (and the supply voltage Vdd for the device) and is enabled in boost converter mode when the DC rail voltage is to be stepped up to produce the battery charge voltage (and the supply voltage Vdd). Note that when the buck and/or boost converter 262 is in the boost mode, the buck transistor is enabled. Further note that the buck and/or boost converter 262 may include multiple inductors, transistors, diodes, and capacitors to produce multiple supply voltages.

When the battery 266 is charging, the battery charge control module 270 monitors the battery current and voltage to insure charging is in accordance with the charging requirements of the battery 266. When the battery 266 is charged, the battery 266 is disconnected from the converter 262 (which may be disabled or enabled to provide Vdd) and the battery 266 may be trickle charged. Note that when the WP is lost, the battery 266 is coupled to provide the power for the device 254.

Figure 11:
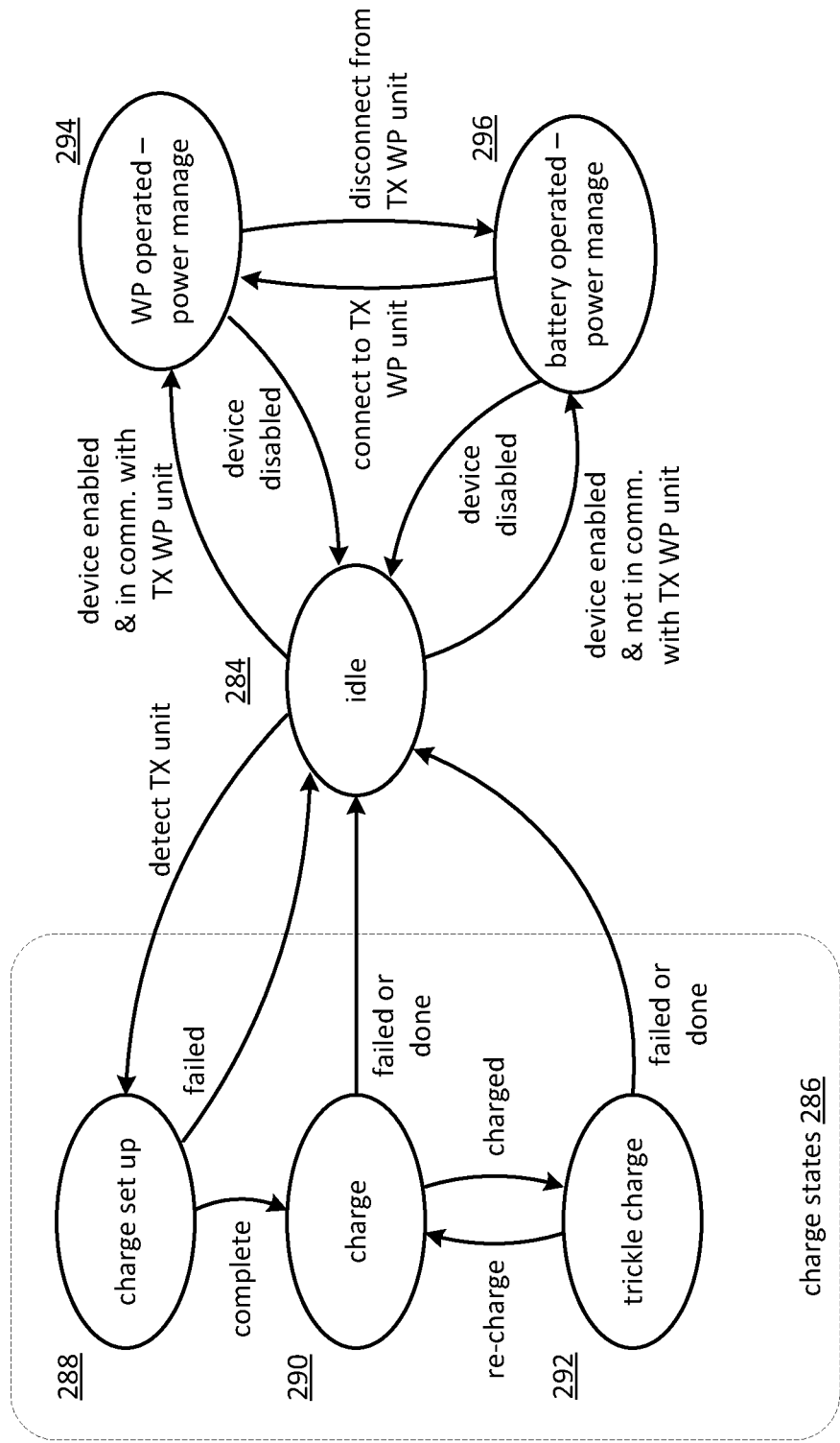
FIG. 11 is an example state diagram of a processing module of a wirelessly powered device in accordance with the present invention.

FIG. 11 is an example state diagram of a processing module of a wirelessly powered device 12-14, 58 that includes six states 286: idle 284, charge set up 288, charge 290, trickle charge 292, WP operated—power management 294, and battery operated—power management 296. The device starts in the idle state 284 and awaits to detect the WP TX unit, WP operation enablement, or battery operation enablement. Note that the device may concurrently be in one of the charge states 286 and the WP operated—power management state 294.

When the device detects the WP TX unit (e.g., via RFID communication, via control channel communication, via sensing a magnetic field, etc.), the device transitions from the idle state 284 to the charge set up state 288. When in the charge set up state 288, the device functions as referenced in FIGS. 12 and/or 13, which will be subsequently discussed. The device transitions back to the idle state 284 if the set up failed, which may result from failing to establish a control channel communication, the WP TX unit not being able to currently service the device, circuit damage, a bad battery, or loss of connection.

The device transitions to the charge state 290 when the charge set up is complete. While in the charge state 290, the device functions as referenced in FIGS. 14 and/or 15, which will be subsequently discussed. The device transitions to the idle state 284 if the charging failed or the charging is complete and the battery does not require a trickle charge. If the charging is complete and the battery will be trickled charge, the device transitions to the trickle charge state 292. The device stays in this state until a failure occurs (e.g., loss of connection with the WP TX unit) or until the trickle charge is complete. In either event, the device transitions back to the idle state 284.

When the device is enabled for operation, the device transitions to the WP operated—power manage state 294 when the device is enabled and is connected to the WP TX unit. While in this state, the device functions as referenced in FIG. 16, which will be subsequently discussed. The device transitions back to the idle state 284 when the device is disabled (e.g., turned off, placed in a sleep mode, etc.). Note that while the device is in this state, it may also be in one of the charge states.

The device transitions from the WP operated state 294 to the battery operated—power manage state 296 when the device is disconnected from the WP TX unit. The device may also enter the battery operated state 296 from the idle state 284 when the device is enabled and not connected to the WP TX unit. While in this state, the device functions as referenced in FIG. 17, which will be subsequently discussed. The device transitions back to the WP operated state 294 when the device is again connected to the WP TX unit. The device transitions back to the idle state 284 when the device is disabled (e.g., turned off, sleep mode, low battery, etc.).

Figure 12:
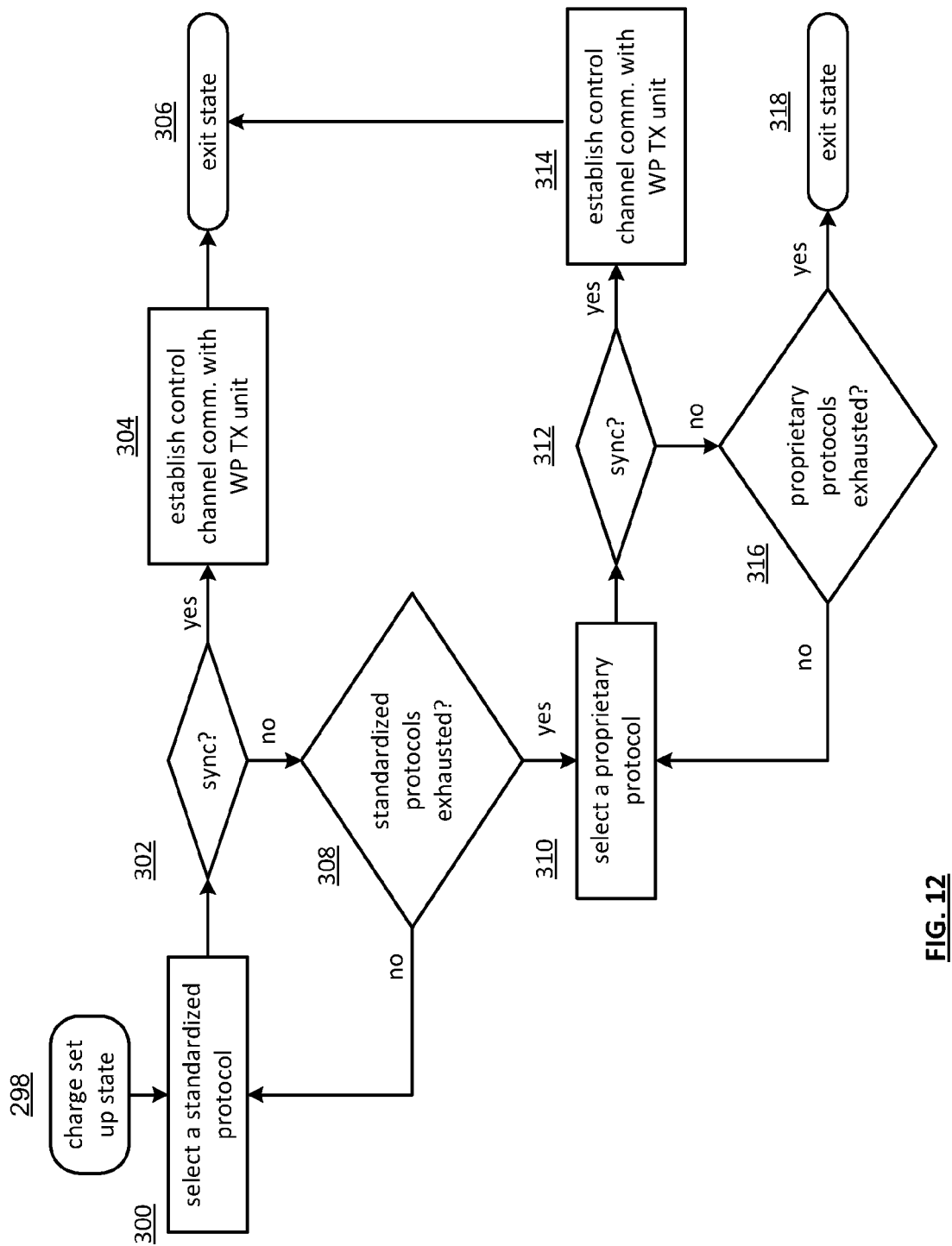
FIG. 12 is a logic diagram of an embodiment of a method for a charge set up state in accordance with the present invention.

FIG. 12 is a logic diagram of an embodiment of a method for a charge set up state 298 that begins with the device working with the WP TX unit to select a standardized communication protocol 300. Examples of the communication protocols were presented with reference to FIGS. 1-3. Note this step may begin by assuming a default communication protocol (e.g., RFID, Bluetooth, etc.) to initiate communication and then, once communication is established, selecting another communication protocol. The method continues with the device determining whether the device is synchronized via a control channel with the WP TX unit 302. In other words, is a useable control channel established between the device and the WP TX unit? If yes, the method continues with the device establishing a control channel communication with the WP TX unit 304 and exiting the state 306.

If a control channel is not established, the method continues with the device determining whether it has exhausted its standardized communication protocols 308 (e.g., the ones it is capable of executing). If not, the process repeats with the device selecting another standardized protocol 300. If the standardized protocols are exhausted, the method continues with the device selecting a proprietary communication protocol 310. Note that the method may begin with proprietary protocols and if they are exhausted, then try standardized protocols.

The method continues with the device determining whether the device is synchronized via a control channel with the WP TX unit using the proprietary protocol 312. If yes, the method continues with the device establishing a control channel communication with the WP TX unit 314 using the proprietary protocol and exiting the state 318.

If a control channel is not established using a proprietary protocol, the method continues with the device determining whether it has exhausted its proprietary communication protocols 316 (e.g., the ones it is capable of executing). If not, the process repeats with the device selecting another proprietary protocol 310. If the proprietary protocols are exhausted, the method continues with the device exiting this state due to a failure 318.

Figure 13:
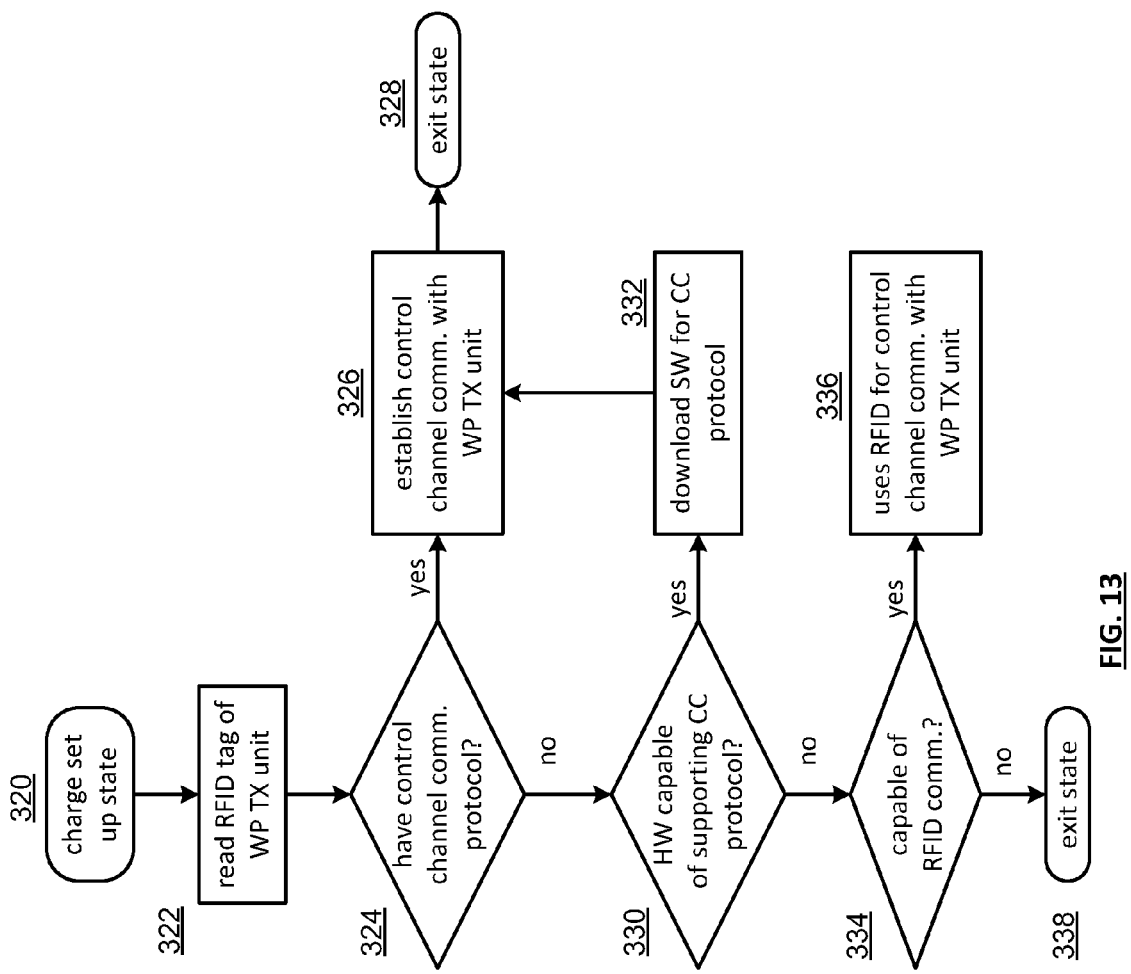
FIG. 13 is a logic diagram of another embodiment of a method for a charge set up state in accordance with the present invention.

FIG. 13 is a logic diagram of another embodiment of a method for a charge set up state 320 that begins with the device reading an RFID tag of the WP TX unit 322 to determine a desired control channel protocol. The method continues with the device determining whether it is capable of executing the desired control channel protocol 324. If yes, the method continues with the device establishing a control channel communication with the WP TX unit 326 and exiting the state 328.

If the device does not have the desired control channel protocol, the method continues with the device determining whether it includes the hardware to support the desired control channel protocol 330. For example, does it include the NFC circuitry, the RF circuitry, and/or the MMW circuitry to support the operating frequency, power requirements, transmission range, etc. of the desired control channel protocol. If yes, then the device is lacking the desired control channel protocol software and the method continues with the device downloading the software for the desired control channel protocol 332. After the device has the software, the method continues with the device establishing a control channel communication with the WP TX unit 326.

If the device does not have the hardware to support the desired control channel protocol, the method continues with the device determining whether it can use RFID as the control channel protocol with the WP TX unit 334. In an embodiment, the device requests that they use RFID, if the WP TX unit agrees, then the method continues with the device using RFID for the control channel with the WP TX unit 336. If the device cannot use RFID for the control channel, then the device exits the state due to a failure 338.

Figure 14:
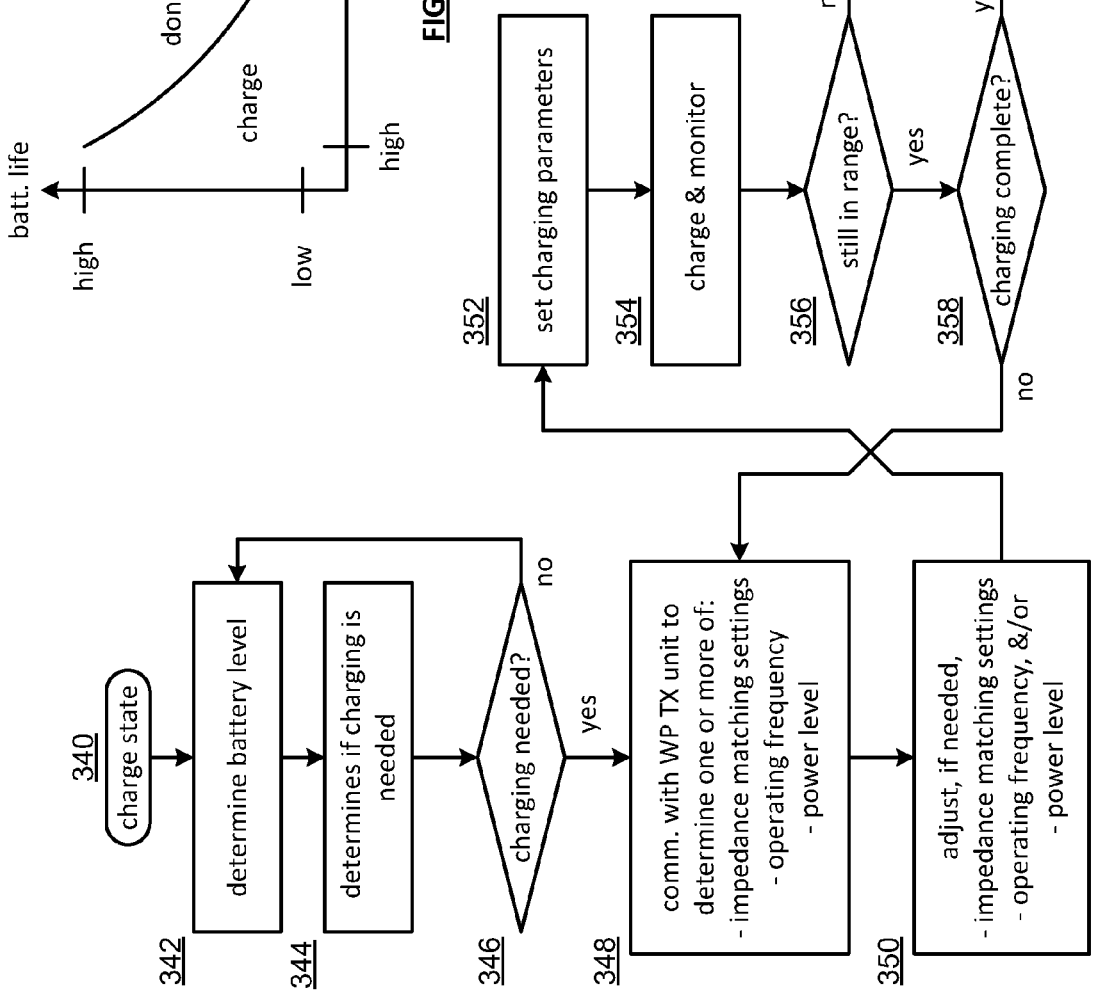
FIG. 14 is a logic diagram of an embodiment of a method for a charge state in accordance with the present invention.

FIG. 14 is a logic diagram of an embodiment of a method for a charge state 340 that begins with the device determining the level of its battery 342 (e.g., the battery life left based on the battery type, the power demands of the device, etc.). The method continues with the device determining if the battery needs charging 344-346. For example, has the power capacity of the battery been drained below a threshold, which may be based on battery life, not being fully charged, and/or some other criteria.

The method branches back to the beginning if the battery does not need charging and branches to the next step if it does. At the next step, the device communicates with the WP TX unit to determine one or more of: impedance matching settings, operating frequency, power level, number of coils, etc 348. The method continues with the device determining whether it needs to adjust one or more of the impedance of its power RX circuit, the operating frequency of the power RX circuit, the power level, etc. and making the appropriate adjustments as needed 350.

The method continues with the device setting charging parameters 352 (e.g., Vdd, current limits, trickle level, charge time intervals, etc.). The method continues with the device charging the battery and monitoring the charging 354 (e.g., the charging current and/or the charging voltage). The device also determines whether it is still in range of the WP TX unit 356. If so, the method continues with the device determining whether the charging is complete 358. If not, the process continues by setting (i.e., adjusting if needed in subsequent repetitions of the loop) the charging parameters 348.

If the device is out of range, the method continues with the device exiting this state due to a failure 360. The device also exits this state 360 if the battery is charged.

Figure 15:
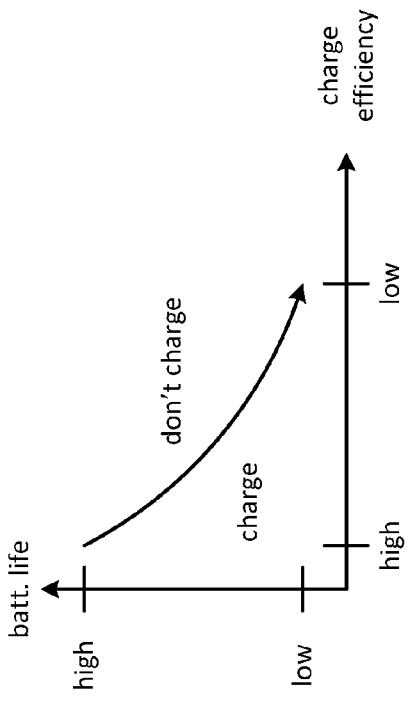
FIG. 15 is a diagram of an example of a graph of charge need versus charge efficiency in accordance with the present invention.

FIG. 15 is a diagram of an example of a graph of charge need versus charge efficiency that may be used by the device to determine whether charging is needed as mentioned in the logic diagram of FIG. 14. As inferred by the diagram of FIG. 15, the determination of whether charging is needed is a sliding scale that varies based on battery life and charging efficiency. As such, when the battery life is high, don't charge the battery unless it can be done efficiently. As the battery life diminishes, the need to charge it is greater, which, at some point, outweighs the desired for the charging to be done efficiently.

Figure 16:
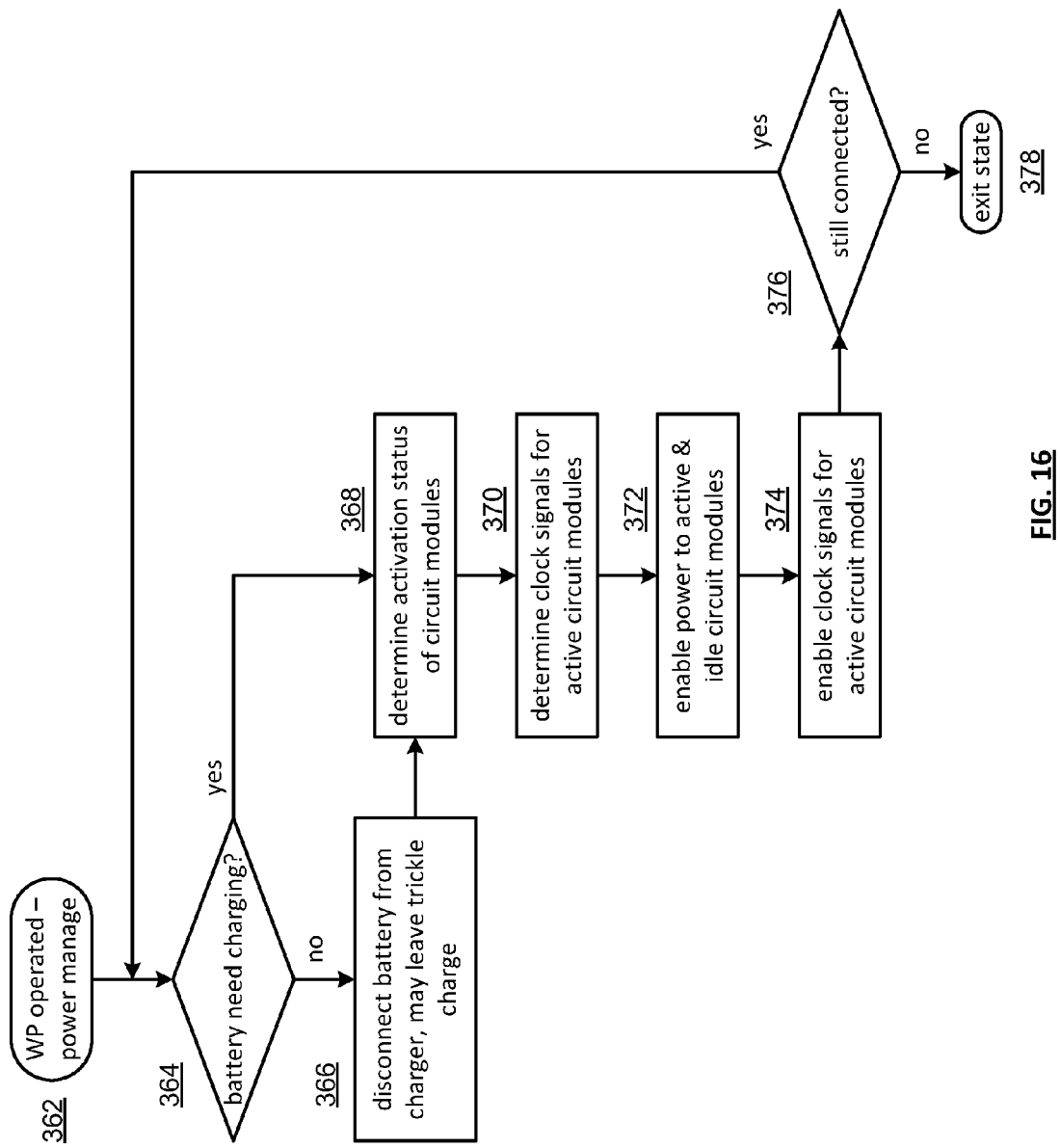
FIG. 16 is a logic diagram of an embodiment of a method for a wirelessly powered power management state in accordance with the present invention.

FIG. 16 is a logic diagram of an embodiment of a method for a wirelessly powered power management state 362 that begins with the device determining whether the battery needs charging 364. If not, the method continues with the device disconnecting the battery from the charger 366. The device may engage a trickle charge if desired or required per the battery charging requirements. The method continues with the device determining the activation status of the circuit modules 368 (e.g., disabled, active, idle, etc.). The method continues with the device determining clock signals for the active circuit modules 370 (e.g., select clock rate to just meet operational needs, which will typically be less than a maximum clock rate).

The method continues with the device determining supply voltages for the active and idle circuit modules 372. For example, the device may set the power levels for idle circuit modules at a level to provide just enough energy to determine whether the circuit module is to remain in the idle state or transition into an active state. As another example, the device may set the power level for active circuits modules to a level just sufficient enough for the circuit module to perform its task, which will typically be less than a maximum power level.

The method continues with the device enabling the clock signals for the active circuits and providing the selected power levels to the active and idle circuit modules 374. The method continues with the device determining whether it is still connected to the WP TX unit 376. If yes, the method repeats from the beginning. If not, the method continues with the device exiting the state 378. Note that in this state, power management of the device is a less critical task than when the device is battery operated. As such, the setting of the clock signal rates and power levels may be set near maximum values to enhance performance.

Figure 17:
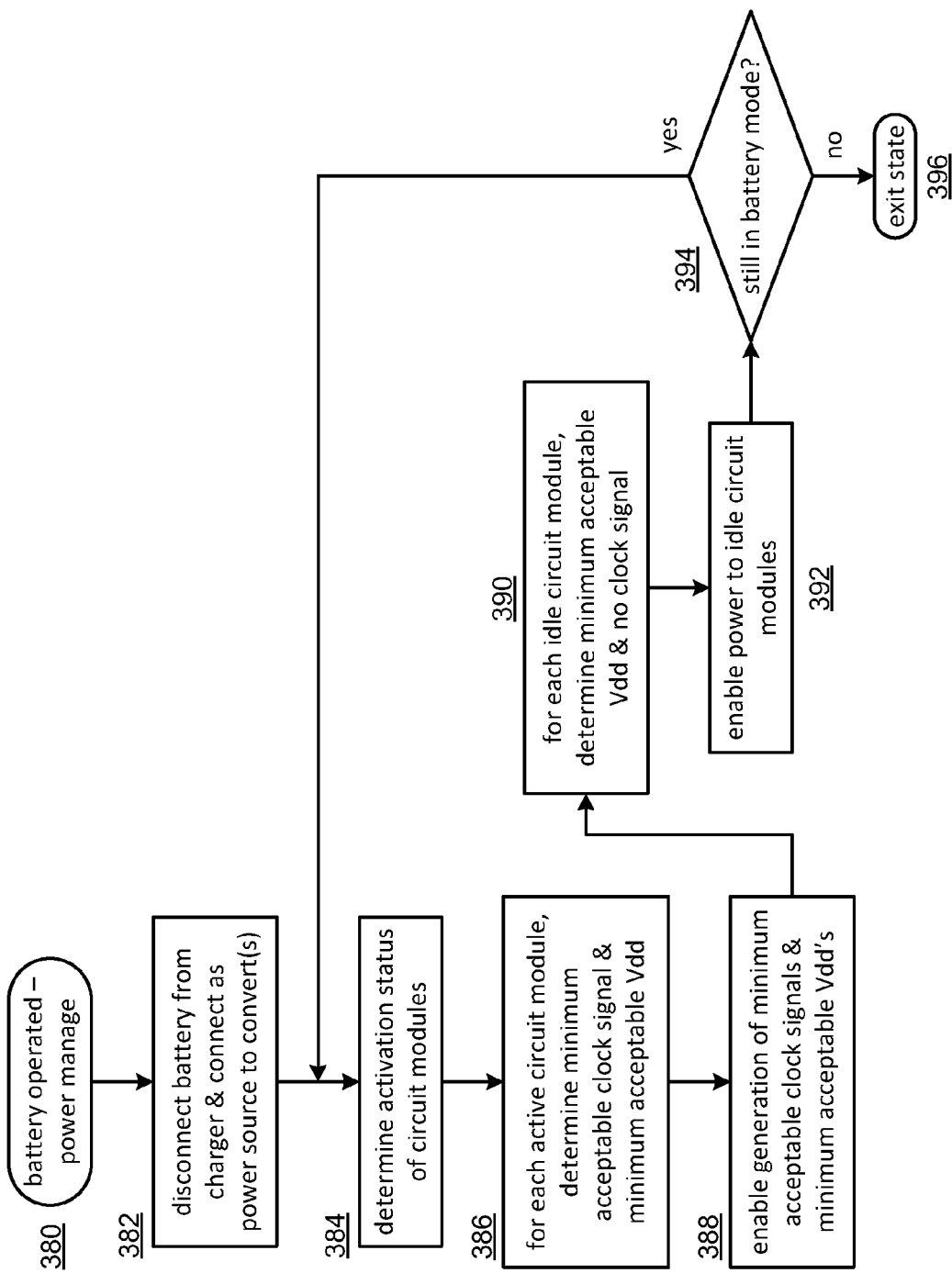
FIG. 17 is a logic diagram of an embodiment of a method for a battery powered power management state in accordance with the present invention.

FIG. 17 is a logic diagram of an embodiment of a method for a battery powered power management state 380 that begins with the device disconnecting the battery from the charger and connecting it as the primary power source 382. The method continues with the device determining activation status of the circuit modules 384 (e.g., disabled, active, idle, etc.). The method continues with the device determining, for each active circuit module, a minimum acceptable clock signal and a minimum acceptable supply voltage 386 (e.g., Vdd).

The method continues with the device enabling generation of the minimum acceptable clock signals by the clock generator and the minimum acceptable supply voltages by the converter 388. The method continues with the device determining, for each idle circuit module, a minimum acceptable idle supply voltage and no clock signal 390. The method continues with the device enabling generation of the idle supply voltage by the converter 392. The method continues with the device determining whether it is still in the battery mode 394. If yes, the method repeats. If not, the device exits this state 396.

Figure 18:
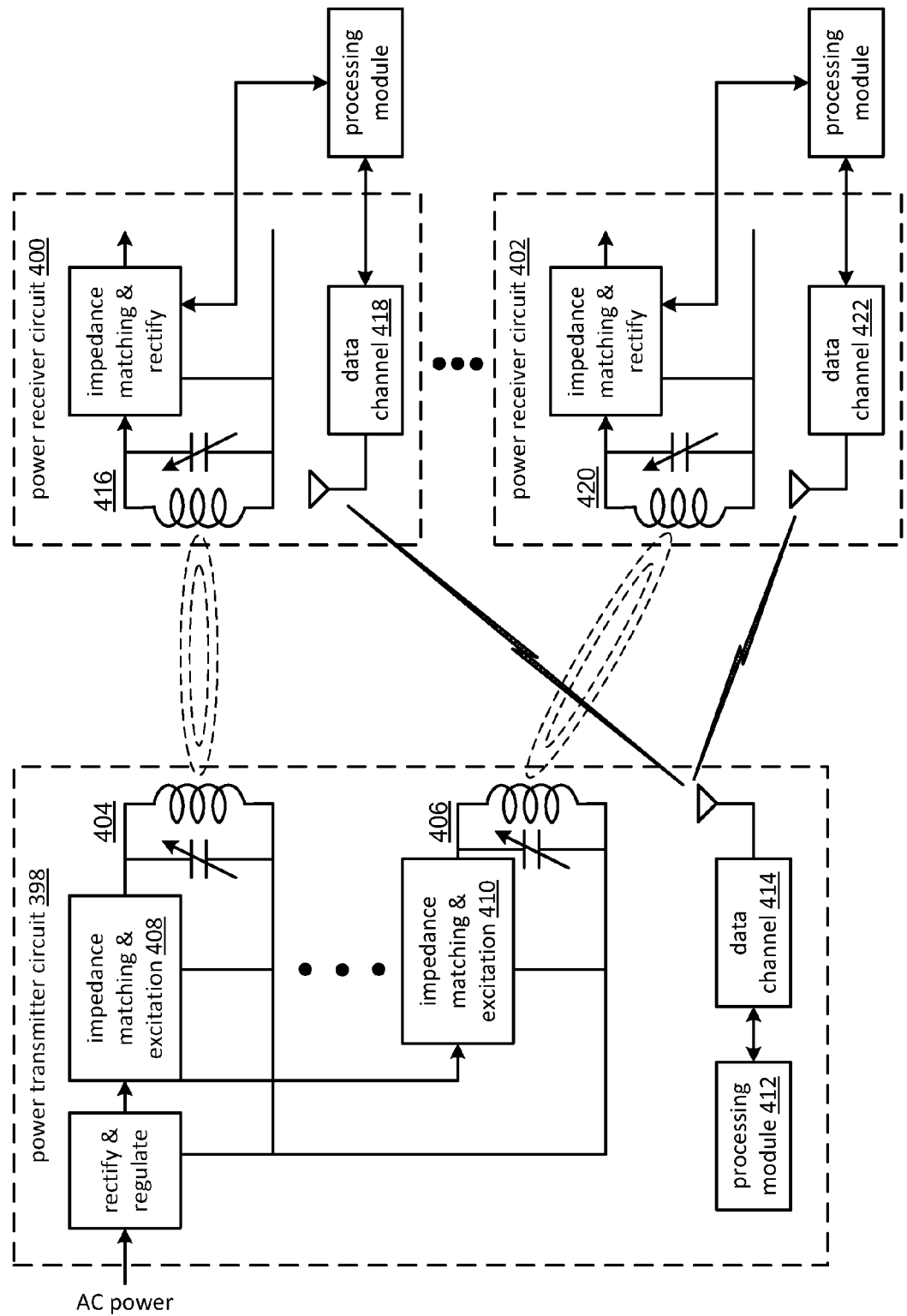
FIG. 18 is a schematic block diagram of another embodiment of a wireless power system in accordance with the present invention.

FIG. 18 is a schematic block diagram of another embodiment of a wireless power system that includes the WP TX unit 398 and a plurality of RX power circuits 400-402. In this embodiment, the WP TX unit 398 includes a plurality of coils 404-406 and impedance matching & excitation circuits, 408-410 where a TX coil 404-406 may be allocated to a RX power circuit 400-402 of a device. Each matching of a TX coil 404-406 to an RX power circuit 400-402 may operate at a unique frequency to minimize interference. Further, the power provided by each TX coil 404-406 may be limited due to a power allocation function of the WP TX unit 398. For example, if the WP TX unit 398 has a maximum output power of 100 Watts and it is coupled to six RX units 400-402, each wanting 20 Watts, the WP TX unit allocates power to the six RX units 400-402 based an allocation scheme (e.g., equal sharing, prioritized sharing, need based, etc.).

The WP TX unit 398 further includes a processing module 412 and a data channel transceiver 414 (RF, MMW, and/or NFC) to communicate with the corresponding transceivers 418-422 of the RX power circuits 400-402. In this manner, the communication protocol includes provisions to support multiple communications.

In this embodiment, the transmit unit processing module 412 (which may be the same as previously discussed processing modules) functions to determine a number of transmit unit coils. The processing module then determines a number of proximal wireless power receive units of the plurality of wireless power receive units. The processing module continues by determining whether the number of transmit unit coils is equal to or greater than the number of proximal wireless power receive units. When the number of transmit unit coils is equal to or greater than the number of proximal wireless power receive units, the processing module continues by determining pairings of a transmit unit coil of the transmit unit coils to a wireless power receive unit of the proximal wireless power receive units. The processing module continues by determining, for each of the pairings, at least one of frequency allocation and power allocation.

When the number of transmit unit coils is less than the number of proximal wireless power receive units, the processing module continues by determining an affiliation of one of the transmit unit coils and at least two of the proximal wireless power receive units. The processing module continues by determining sharing parameters of the one of the transmit unit coils by the at least two of the proximal wireless power receive units. Sharing the transmit coil(s) will be discussed in greater detail with reference to FIG. 19.

Figure 19:
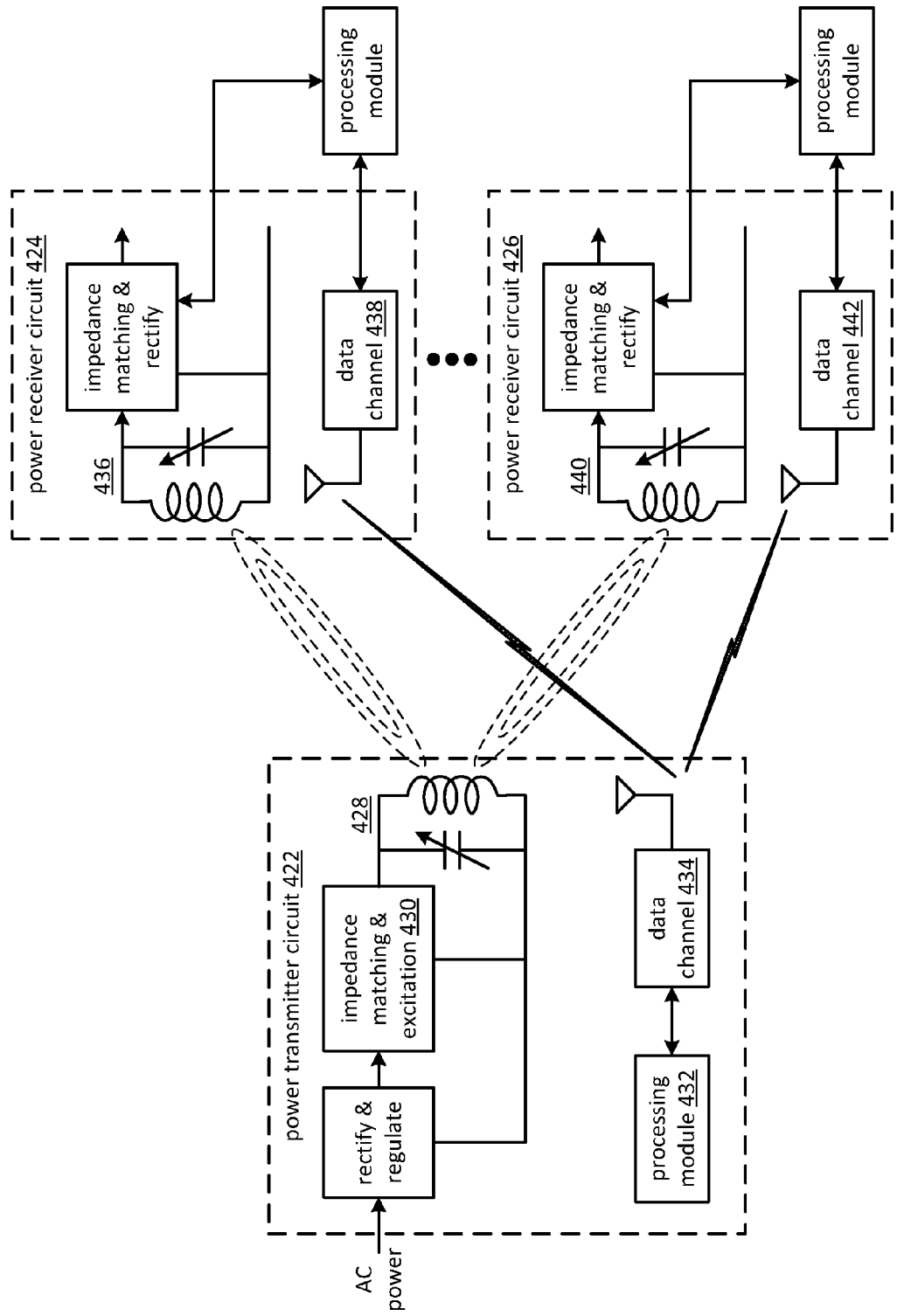
FIG. 19 is a schematic block diagram of another embodiment of a wireless power system in accordance with the present invention.

FIG. 19 is a schematic block diagram of another embodiment of a wireless power system that includes the WP TX unit 422 and a plurality of RX power circuits 424-426. In this embodiment, the WP TX unit 422 includes a TX coil 428 and an impedance matching & excitation circuit 430, where the RX power circuits 424-426 share the TX coil 428. The sharing of the TX coil 428 may be concurrent and/or sequential. For example, if the RX coil 436, 440 of multiple RX power circuits 424-426 is in range of the magnetic field generated by the TX coil 428, then multiple RX power circuits 424-426 may be concurrently enabled. In this instance, power limiting may be required based on the power capabilities of the WP TX unit 422 and the power requirements of the RX power circuits 424-426.

When the TX coil 428 is shared in a sequential manner, each RX power circuit 424-426 needing wireless power is provided time divisional multiple access (TDMA) access to the TX coil 428. The time slots of the TDMA allocation scheme may be the same size or of different sizes. Also an RX power circuit 424-426 may be allocated more than one time slot per TDMA frame.

When the TX coil 428 is shared in a concurrent and sequential manner, the RX power circuit 424-426 may be grouped, where, from group to group, there is TDMA access to the TX coil 428. Within a group, however, the access to the TX coil 428 is concurrent. In this manner, a single TX coil 428 may support multiple RX power circuits 424-426.

The WP TX unit 422 further includes a processing module 432 and a data channel transceiver 434 (RF, MMW, and/or NFC) to communicate with the corresponding transceivers 438, 442 of the RX power circuits 424-426. In this manner, the communication protocol includes provisions to support multiple communications.

Figure 20:
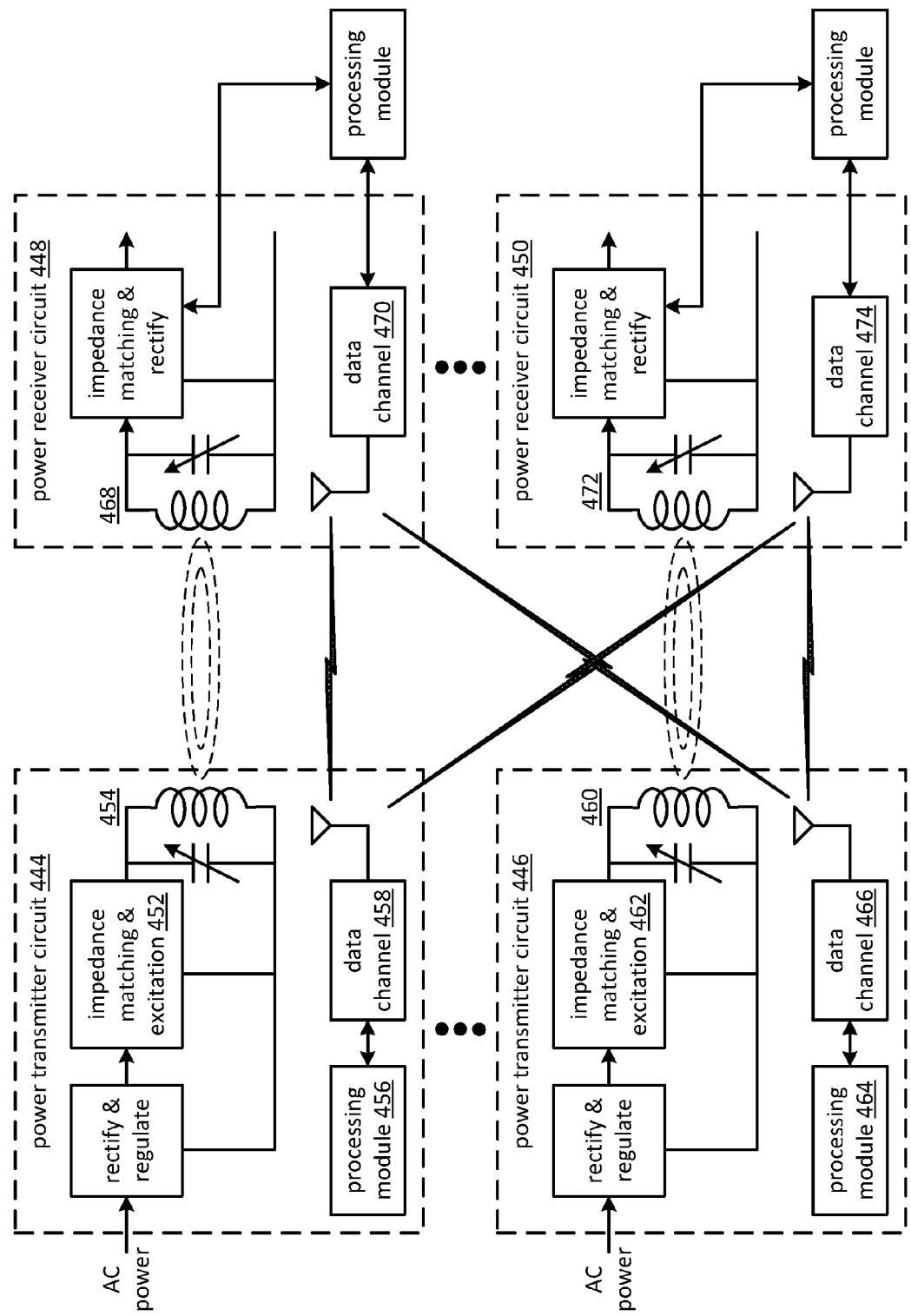
FIG. 20 is a schematic block diagram of another embodiment of a wireless power system in accordance with the present invention.

FIG. 20 is a schematic block diagram of another embodiment of a wireless power system that includes a plurality of WP TX units 444-446 and a plurality of RX power circuits 448-450. In this embodiment, each WP TX unit 444-446 includes a TX coil 454, 460 and an impedance matching & excitation circuit 452, 462 and may be allocated to one of the RX power circuits 448-450. Each matching of a WP TX unit 444-446 to an RX power circuit 448-450 may operate at a unique frequency to minimize interference.

The WP TX unit 444-446 further includes a processing module 456, 464 and a data channel transceiver 458, 466 (RF, MMW, and/or NFC) to communicate with the corresponding transceivers 470, 474 of the RX power circuits 448, 450. In this manner, the communication protocol includes provisions to support multiple communications.

For a given geographic area (e.g., an office, a home, a public internet café, etc.) may include one or more the WP system of FIGS. 18-20, which would require communication between to the system to minimize interference there between. In any of the systems, an RX power circuit may be paired with a TX coil that provides an efficient WP transfer. In this regard, allocation of RX coil to an RX power circuit may change to make the overall system more efficient.

FIG. 21 is a diagram of an example of frequency planning within a wireless power system that includes one or more frequency bands for wireless power (WP) transmissions (5-50 MHz), one or more frequency bands for WP control channel communications (e.g., 2400 MHz, 5800 MHz, 60 GHz, etc.), and one or more frequency bands used by the device based on the device function (e.g., 900 MHz, 1800 MHz, 60 GHz, etc.). Also shown are harmonics of the WP frequency bands and that the device frequency bands may overlap or fully coincide with the WP control channel frequency bands. Without some frequency planning, unnecessary interference with the operation of the device and/or the control channel communications may result.

FIG. 22 is a diagram of another example of frequency planning within a wireless power system to avoid harmonics of the WP frequency bands interfering with the channels being use by the device. In this example, the WP frequencies that produce harmonics that coincide with the channels being used by the device are avoided, thus avoiding the generation of interfering harmonics. The WP TX unit may determine the channels being used by the device via reading the RFID of the device, by control channel communication, by frequency sweeping, and/or any other detection mechanism.

In this example, the channels being used by the device do not overlap with the WP control channel frequency bands. Thus, any channel within the WP control channel frequency band may be used for WP control channel communications.

Figure 23:
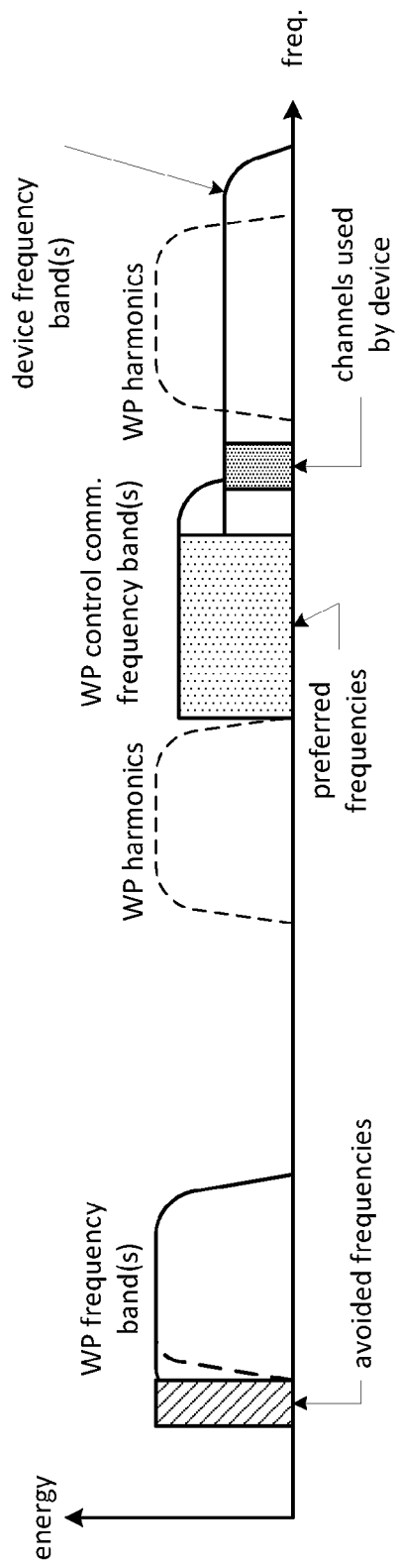
FIG. 23 is a diagram of another example of frequency planning within a wireless power system in accordance with the present invention.

FIG. 23 is a diagram of another example of frequency planning within a wireless power system to avoid harmonics of the WP frequency bands interfering with the channels being use by the device. In this example, the WP frequencies that produce harmonics that coincide with the channels being used by the device are avoided, thus avoiding the generation of interfering harmonics. The WP TX unit may determine the channels being used by the device via reading the RFID of the device, by control channel communication, by frequency sweeping, and/or any other detection mechanism.

In this example, the channels being used by the device overlap with the WP control channel frequency bands. Thus, the overlapping WP control channels are avoided and a non-overlapping channel of the WP control channel frequency band is used for WP control channel communications.

Figure 24:
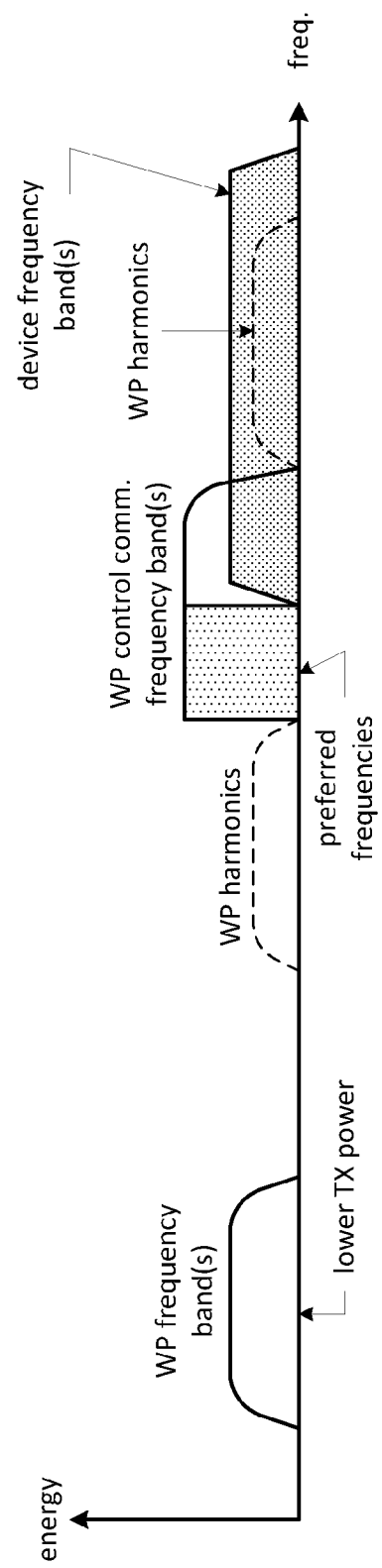
FIG. 24 is a diagram of another example of frequency planning within a wireless power system in accordance with the present invention.

FIG. 24 is a diagram of another example of frequency planning within a wireless power system to avoid harmonics of the WP frequency bands interfering with the channels being use by the device. In this example, the device uses its entire frequency spectrum (e.g., CDMA, spread spectrum, etc.) and overlap of WP frequency harmonics with the channels being used by the device cannot be avoided. In this instance, the power level of the TX signals is lowered to reduce the harmonic interference.

In this example, the channels being used by the device overlap with the WP control channel frequency bands. Thus, the overlapping WP control channels are avoided and a non-overlapping channel of the WP control channel frequency band is used for WP control channel communications.

FIG. 25 is a diagram of another example of frequency planning within a wireless power system that is supporting multiple RX power circuits by multiple TX coils (e.g., one unit with multiple coils and/or multiple WP TX units). As shown, each device uses some, but not all, of the channels in the device frequency band spectrum. This provides frequencies within the WP frequency band to avoid. From the available frequencies, one or more channels are selected for the first device and one or more channels are selected for the second device.

In this example, the channels being used by the devices do not overlap with the WP control channel frequency bands. Thus, any channel within the WP control channel frequency band may be used for WP control channel communications.

FIG. 26 is a diagram of another example of frequency planning within a wireless power system that supports multiple devices with a single TX coil. In this example, the above interference issues apply with the further processing of TDMA allocation of the TX coil to first and second devices. Note that, from the device to device, the interference avoidance techniques may vary from device to device. As such, what frequencies work to avoid interference for one device may not be the same frequencies that avoid interference for another device. Further note that multiple coils may be used, where each coil supports multiple RX units in this manner.

FIG. 27 is a diagram of another example of frequency planning within a wireless power system that supports multiple devices with a single TX coil. In this example, the above interference issues apply with the further processing of TDMA and FDMA (frequency division multiple access) allocation of the TX coil to first and second devices. Note that, from the device to device, the interference avoidance techniques may vary from device to device. As such, what frequencies work to avoid interference for one device may not be the same frequencies that avoid interference for another device. Further note that multiple coils may be used, where each coil supports multiple RX units in this manner.

Figure 28:
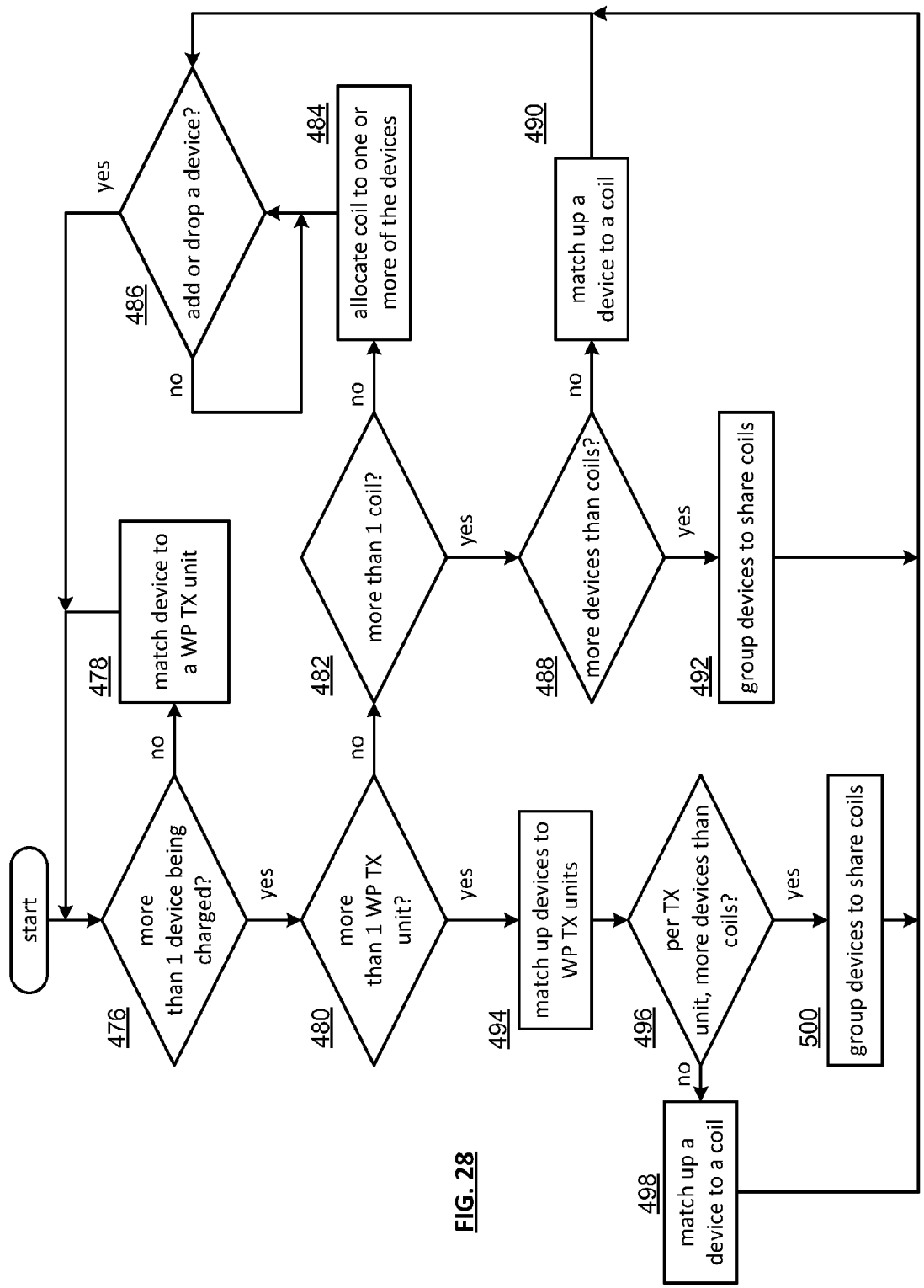
FIG. 28 is a logic diagram of an embodiment of a method for managing a wireless power system in accordance with the present invention.

FIG. 28 is a logic diagram of an embodiment of a method for managing a wireless power system that begins with the WP TX unit determining whether more than 1 device is being charged or is to be charged 476. If not, method continues with the WP TX unit matching the device with a WP TX unit in a multiple WP TX unit system or with one of a plurality of TX coils of a WP TX unit 478. The matching may be determined based on proximal location, efficiency of magnetic coupling, power requirements, etc. The method repeats from the beginning.

If there is more than 1 device to charge, the method continues with the WP TX unit determining whether there is more than 1 WP TX unit within the system 480. If not, the method continues with the WP TX unit determining whether it has more than 1 TX coil 482. If not, the method continues with the WP TX unit allocating the TX coil to one or more of the devices in a TDMA manner, a TDMA-FDMA manner, based on priority need, based on power limits, etc 484. The method continues with the WP TX unit determining whether a device has been added or dropped from the wireless power system 486 (e.g., is off, the battery is fully charged, the device has moved out of range, etc.). The method remains in this loop until a device is added or deleted from the system.

If the WP TX unit determines that it includes more than 1 TX coil, the method continues with the WP TX unit determining whether there are more devices requesting wireless power service than the number of TX coils it has 488. If not, the method continues with the WP TX unit matching devices to coils based on one or more of frequency, power, proximity, control channel communications, availability, interference avoidance, etc 490. The method then repeats at the step of adding or deleting a device from the system 486.

If the WP TX unit determines that there are more devices requesting wireless power access than it has coils, the method continues with the WP TX unit grouping the devices to share one or more of its TX coils 492. The method then repeats at the step of adding or deleting a device from the system 486.

If the WP TX unit determines that the system includes more than one WP TX unit, the method continues with the WP TX units coordinating to match the devices with one or more of the WP TX units 494. The method continues with the WP TX unit(s) determining whether, per WP TX unit, there are more devices allocated to it than it has coils 496. If not, the method continues with the WP TX unit(s) matching devices to TX coils 498. If there are more devices than coil, the method continues with the WP TX unit grouping the devices to share one or more of its TX coils 500. The method then repeats at the step of adding or deleting a device from the system 486.

Figure 29:
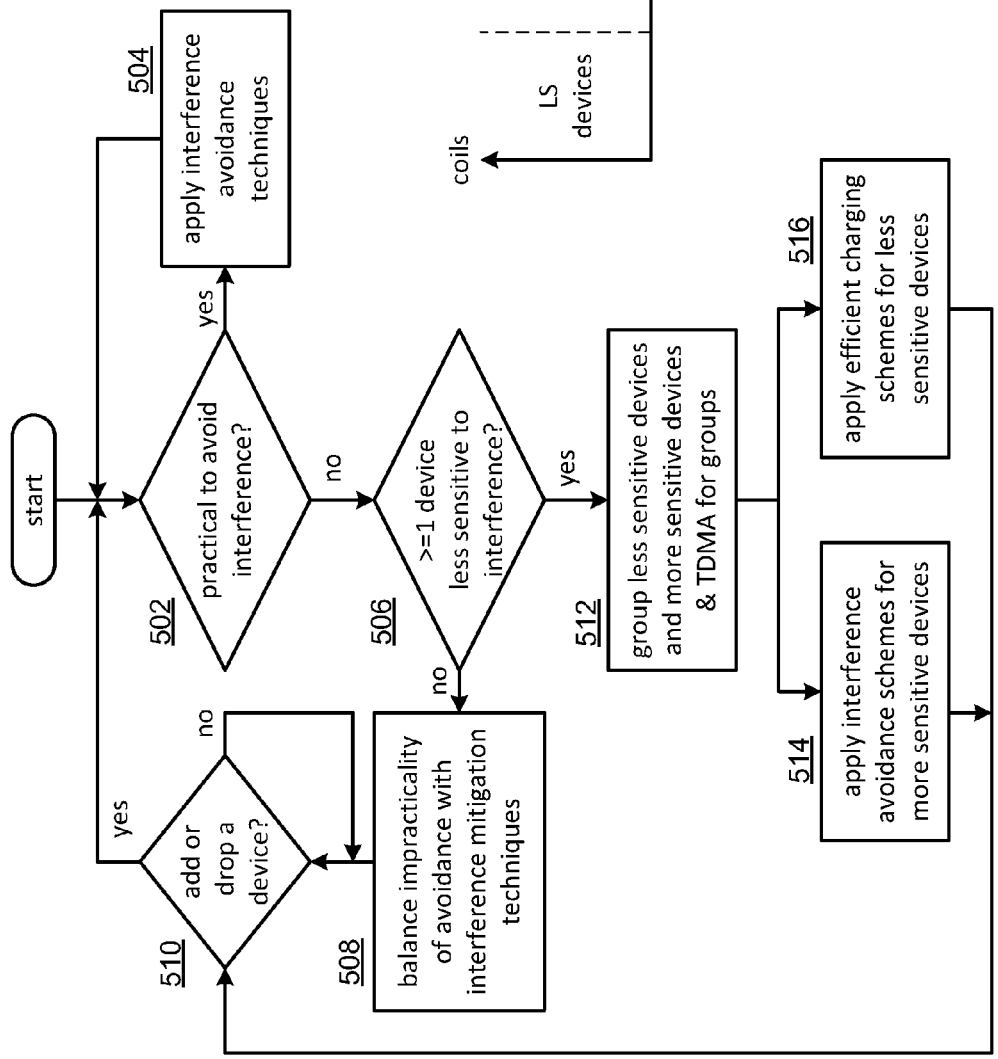
FIG. 29 is a logic diagram of another embodiment of a method for managing a wireless power system in accordance with the present invention.

FIG. 29 is a logic diagram of another embodiment of a method for managing a wireless power system that begins with the WP TX unit determining whether it is practical to avoid interference 502 (e.g., can apply one or more of the techniques previously described). If yes, the method continues with the WP TX unit applying one or more of the interference avoidance techniques 504 and the method repeats from the beginning.

If, however, it is not practical to avoid interference, the method continues with the WP TX unit determining whether there are one or more devices that are less sensitive to interference than the other devices 506. If not, the method continues with the WP TX unit balancing the impracticality of interference avoidance with the interference mitigation techniques 508. For example, the power may be reduced, charging rates may be changed to reduce power, prioritization schemes may be adjusted, etc. The method continues with the WP TX unit determining whether a device has been added to or deleted from the system 510. If not, the loop repeats until a device is added or deleted. When a device is added or deleted, the method repeats at the beginning.

If the WP TX unit determines that there is at least one less sensitive device 506, the method continues with the WP TX unit grouping the devices based on their sensitivity 512. For example, less sensitive devices are grouped together as are more sensitive devices. The method continues with the WP TX unit applying interference avoidance schemes for the more sensitive devices 514 and applying efficient charging schemes for the less sensitive devices 516.

Figure 30:
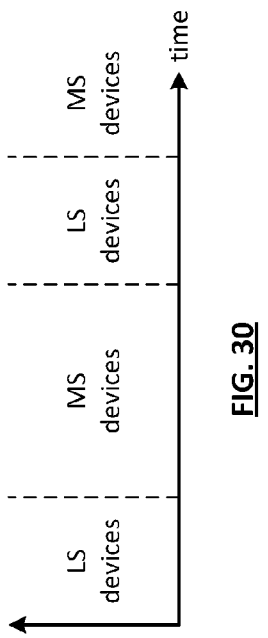
FIG. 30 is a diagram of an example of managing a wireless power system in accordance with the present invention.

FIG. 30 is a diagram of an example of managing a wireless power system where less interference sensitive devices are grouped together as are more interference sensitive devices.

Figure 31:
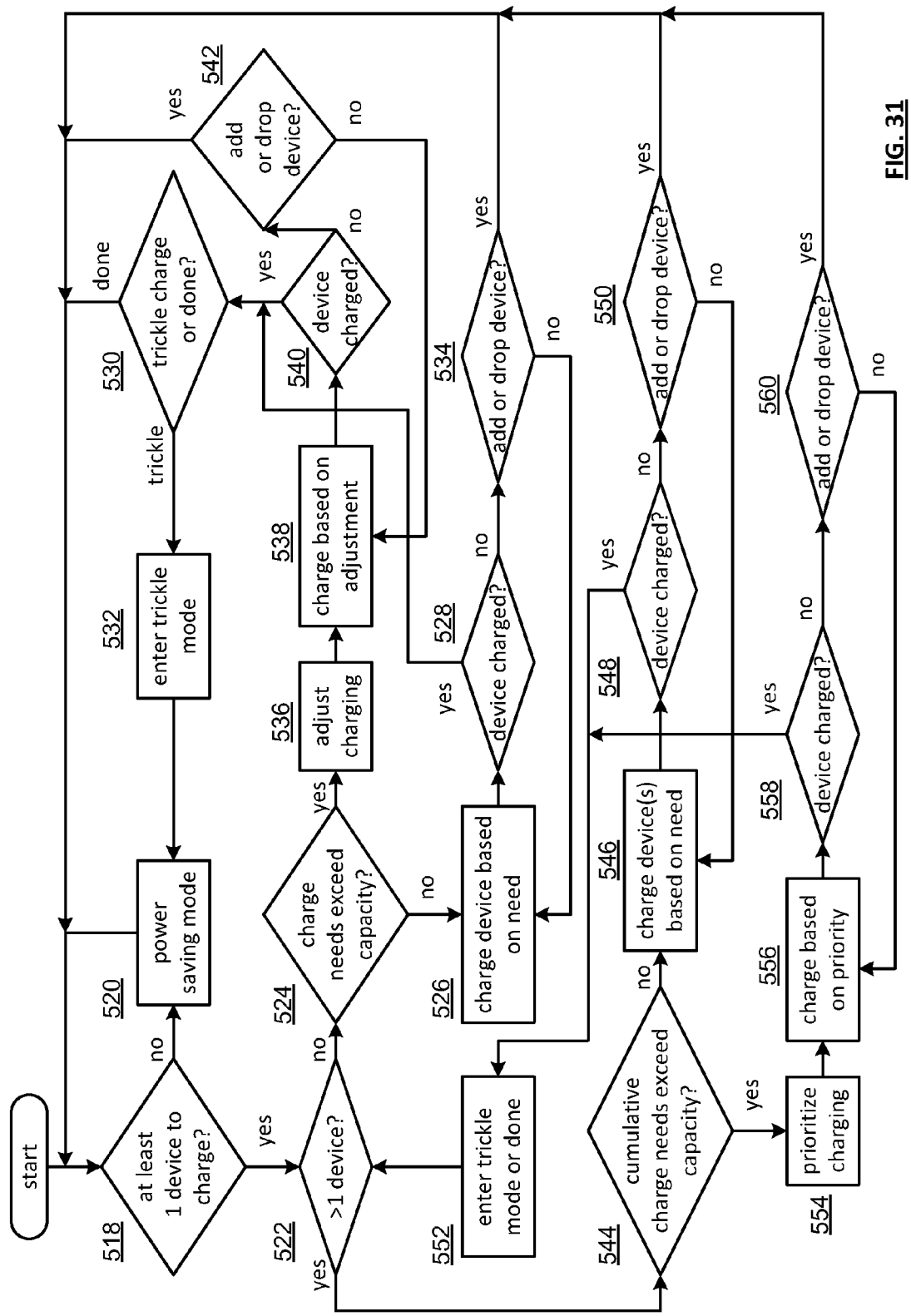
FIG. 31 is a logic diagram of another embodiment of a method for managing a wireless power system in accordance with the present invention.

FIG. 31 is a logic diagram of another embodiment of a method for managing a wireless power system that begins with the WP TX unit determining whether there is at least one device to charge and/or requesting wireless power 518. If not, the method continues with the WP TX unit entering a power savings mode 520. In this mode, the WP TX unit does not provide power to its TX coils to reduce power consumption. Also in this mode, the WP TX unit provides sufficient power to the WP transceiver such that the control channel remains active.

If there is at least one device to charge or requesting wireless power, the method continues with the WP TX unit determining whether there is more than one device to charge or requesting wireless power 522. If not, the method continues with the WP TX unit determining whether the charging and/or wireless power needs of the device exceeds the power capabilities of the WP TX unit 524. If not, the method continues with the WP TX unit providing wireless power to the device to meet its charging needs and/or wireless power needs 526.

The method continues with the WP TX unit determining whether the device is charged and/or whether the device's wireless power needs have been met 528. If yes, the method continues by determining whether the device requires a trickle charge 530. If yes, the method continues with the WP TX unit providing enough wireless power to support a trickle charge 532. The method then repeats at the power saving mode step 520. If, however, the device does not require a trickle charge, the method repeats from the beginning. If the device is not charged and/or the device's wireless power needs have not been met, the method continues with the WP TX unit determining whether a device is added or dropped from the system 534. If not, the method repeats at the charge device based on need step 526. If, however, a device is added or dropped (e.g., the present device loses connection to the WP TX unit) from the system, the method repeats from the beginning.

If the WP TX unit determines that the charging or wireless power needs of the device exceeds its power capabilities, the method continues with the WP TX unit adjusting the charging and/or wireless power needs of the device to conform with the WP TX unit capabilities 536. The method continues with the WP TX unit providing wireless power to the device to charge its battery and/or to meet is wireless power needs 538. The method continues with the WP TX unit determining whether the device is charged and/or whether the device's wireless power needs have been met based on the adjusted wireless power needs 540. If yes, the method continues by determining whether the device requires a trickle charge 530. If yes, the method continues with the WP TX unit providing enough wireless power to support a trickle charge 532. The method then repeats at the power saving mode step 520. If, however, the device does not require a trickle charge, the method repeats from the beginning. If the device is not charged and/or the device's wireless power needs have not been met in accordance with the adjusted wireless power needs, the method continues with the WP TX unit determining whether a device is added or dropped from the system 542. If not, the method repeats at the charge device based on need step 538. If, however, a device is added or dropped (e.g., the present device loses connection to the WP TX unit) from the system, the method repeats from the beginning.

If the WP TX unit determines that there is more than one device to charge and/or requesting wireless power, the method continues with the WP TX unit determining cumulative wireless power needs of the more than one devices and whether the needs exceeds the capabilities of the WP TX unit 544. If not, the method continues with the WP TX unit providing wireless power to the devices for charging and/or for their wireless power requests based on their respective needs 546. The method continues with the WP TX unit determining whether one of the devices has been charged and/or its wireless power needs have been met 548. If so, the method continues with the WP TX unit providing wireless power to the device to support a trickle charge mode 552 and the process repeats at the determining more than 1 device step 522.

If the devices are not charged and/or the devices' wireless power needs have not been met, the method continues with the WP TX unit determining whether a device is added or dropped from the system 550. If not, the method repeats at the charge devices based on wireless power needs step 546. If, however, a device is added or dropped (e.g., a device loses connection to the WP TX unit) from the system, the method repeats from the beginning.

If the WP TX unit determines that the cumulative wireless power needs exceeds its wireless power capabilities, the method continues with the WP TX unit adjusting charging and/or wireless power needs of the devices 554. This may be done unilaterally or based on communication with the devices. The method continues with the WP TX unit providing wireless power to the devices based on the adjusted wireless power needs 556. The method continues with the WP TX unit determining whether one of the devices has been charged and/or its wireless power needs have been met 558. If so, the method continues with the WP TX unit providing wireless power to the device to support a trickle charge mode 552 and the process repeats at the determining more than 1 device step 522.

If the devices are not charged and/or the devices' wireless power needs have not been met, the method continues with the WP TX unit determining whether a device is added or dropped from the system 560. If not, the method repeats at the charge devices based on wireless power needs step 556. If, however, a device is added or dropped (e.g., a device loses connection to the WP TX unit) from the system, the method repeats from the beginning.

Figure 32:
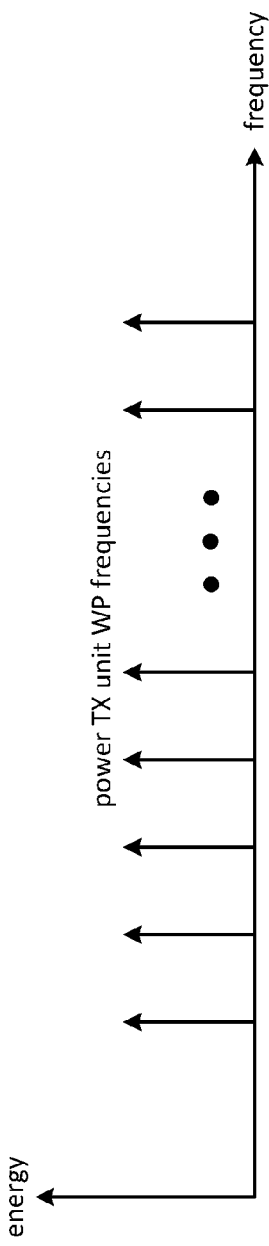
FIG. 32 is a diagram of an example of power transmit frequency spectrum for a wireless power system in accordance with the present invention.

FIG. 32 is a diagram of an example of power transmit frequency spectrum for a wireless power system. In this example, the WP TX unit frequency spectrum includes a plurality of frequencies equally spaced. The frequencies may represent a single carrier frequency or a channel (e.g., a range of frequencies). The WP TX unit may include one coil circuit that is tunable to at least some of the frequencies in its frequency spectrum or includes a plurality of TX coil circuits that are tunable to at least two frequencies in the frequency spectrum. In an embodiment, the WP TX unit may transmit its frequency spectrum pattern on the control channel and/or via an RFID message.

Figure 33:
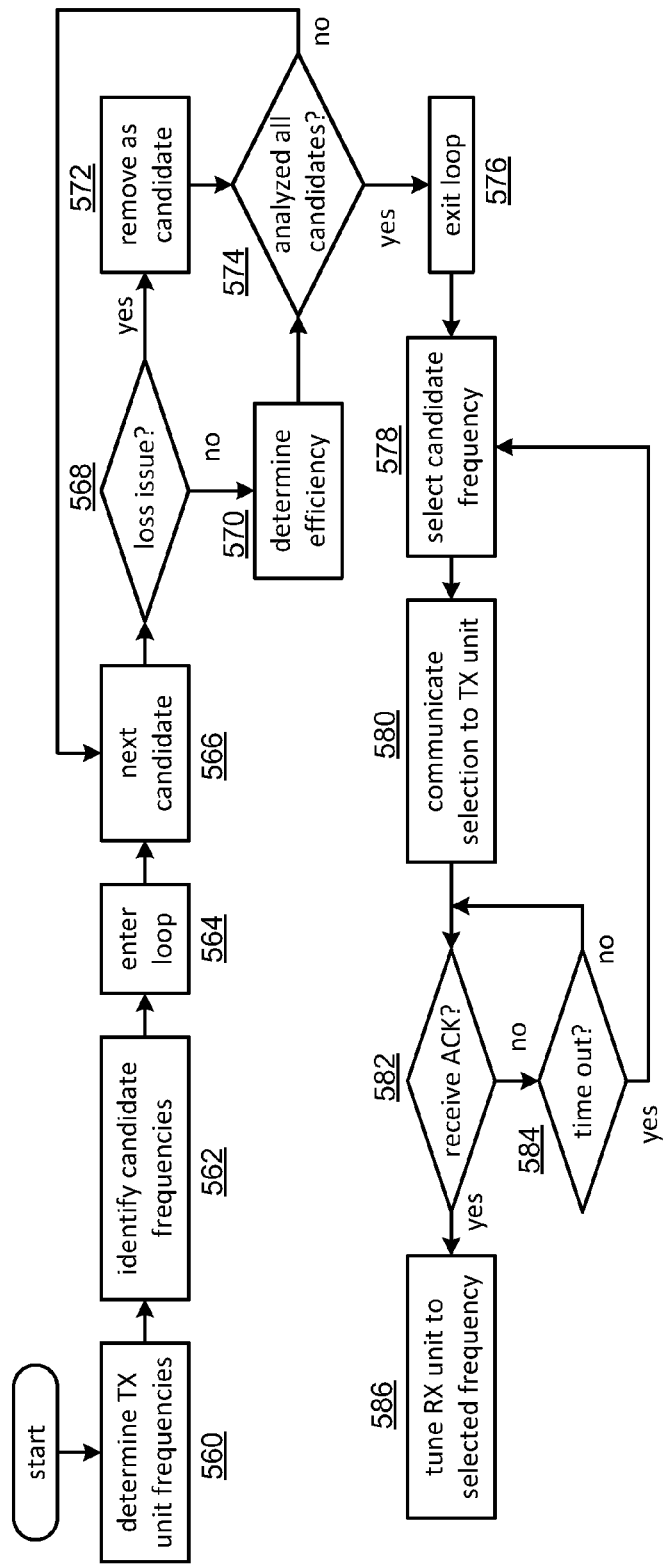
FIG. 33 is a logic diagram of another embodiment of a method for managing a wireless power system in accordance with the present invention.

FIG. 33 is a logic diagram of another embodiment of a method for managing a wireless power system that begins with the device determining the TX WP frequencies within the WP TX frequency spectrum that the WP TX unit is capable of using 560. For example, the device may receive the control channel and/or RFID message that indicates the WP TX frequencies and/or may perform a frequency scan to identify the TX WP frequencies. The method continues with the device identifying potential frequencies that it may use to meet its wireless power needs 562. The devices flag such frequencies as candidate frequencies.

The method continues with the device entering a loop 564. The loop begins with the device selecting one of the candidate frequencies from the list of candidate frequencies previously created 566. The method continues with the device determining whether there are loss issues for this candidate frequency 568. Loss issues include poor magnetic coupling, magnetic field interference, interference with operation of the device, interference with control channel communication, and/or any other factor that would result in a less than optimal magnetic coupling with the WP TX unit and/or less than optimal performance of the device.

If the device determines that the current candidate frequency does not have a loss issue, the device determines the efficiency of using the candidate frequency 570, which may include determining magnetic coupling efficiency, with tunable range of devices RX coil and impedance matching circuitry, etc. The device records this information. If, however, the device determines that there is a loss issue, the device removes this candidate frequency from the list 572. In either event, the method continues with the device determining whether it has analyzed all or a desired number of the candidate frequencies 574. If not, the loop is repeated for another candidate frequency 566. If yes, the method continues with the device exiting the loop 576.

After exiting the loop, the device selects one of the remaining candidate frequencies to use to meet its wireless power needs 578. The method continues with the device communicating its selection of a frequency to the WP TX unit 580. The method continues with the device determining whether the WP TX unit has acknowledged the use of the selected frequency 582. If not, the device determines whether a time out period has expired 584. If not, the device waits in a loop for an ACK 582 or for the time out to expire. If the time out expires, the device selects another frequency 578 and repeats the process. If the WP TX unit acknowledges the selected frequency, the method continues with the device tuning is RX power circuit to the selected frequency 586.

Figure 34:
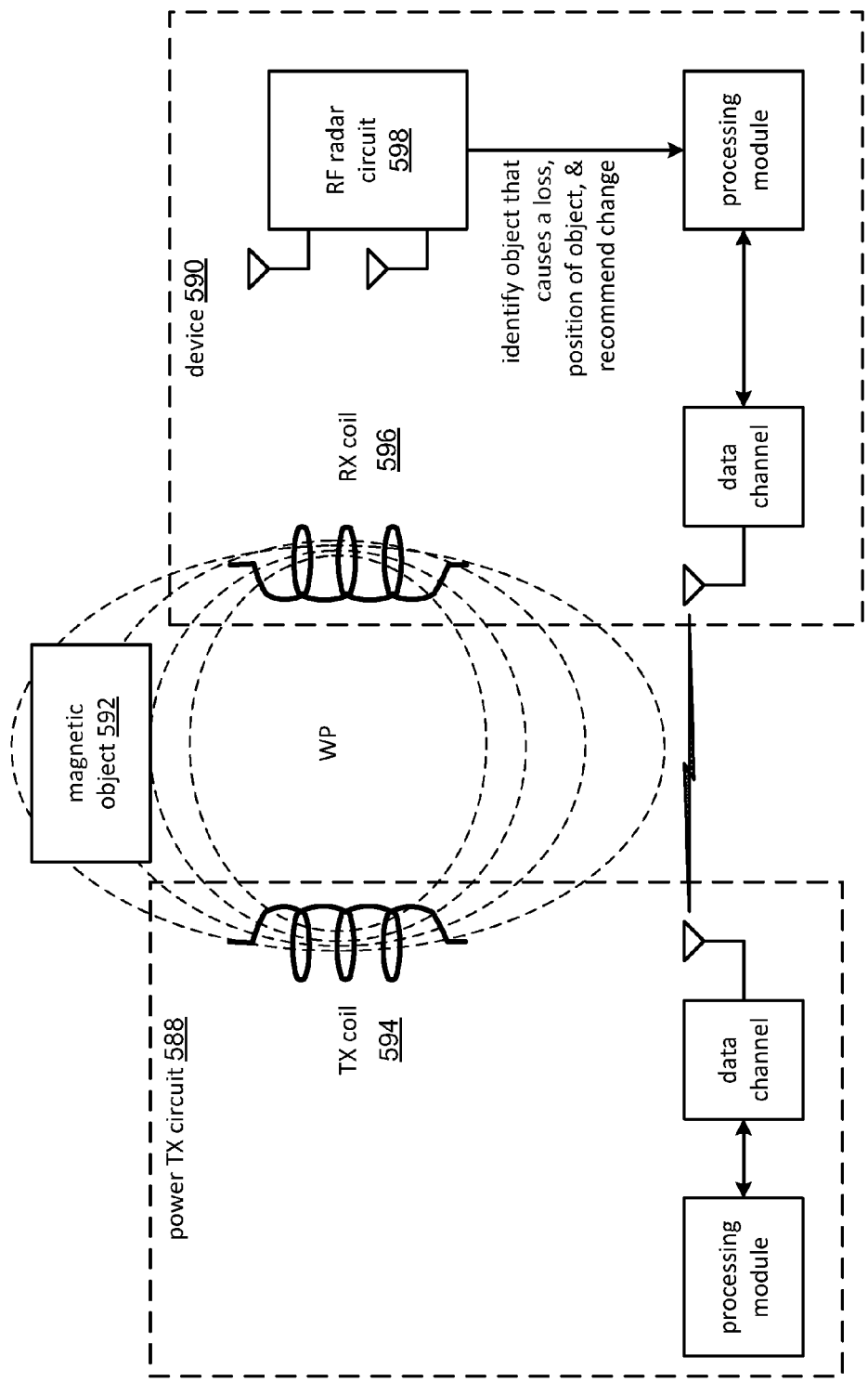
FIG. 34 is a schematic block diagram of another embodiment of a wireless power system in accordance with the present invention.

FIG. 34 is a schematic block diagram of another embodiment of a wireless power system that includes the WP TX unit 588 and the device 590. In this diagram, a magnetic object 592 (e.g., keys, magnetic, etc.) is proximal to the WP TX unit 588 and the device 590 such that it may interfere with the magnetic coupling between the TX coil 594 and the RX coil 596. When this is the situation, the WP TX unit 588 and the device 590 attempt to mitigate the adverse affects of the magnetic object 592. For example, the WP TX unit 588 and the device 590 may change the operating frequency, change the orientation of the magnetic field, issue a message indicating repositioning of the device 590, use a different TX coil, use a different RX coil, and/or increase the magnetic field to saturate the object. If no viable solution exists, issue a message on the device 590 to move the magnetic object 592 and do not enable wireless power until the interferer is moved.

The WP TX unit 588 and/or the device 590 may determine the presence of an interferer by determining that the actual magnetic coupling is noticeably less than the expected magnetic coupling. In addition or as an alternative, the device 590 includes an RF radar circuit 598 that performs an RF radar sweep of the device's 590 proximal area. The RF radar response can be used to determine the type of material of the object 592 (e.g., metal, organic, etc.) and the relative position of the object 592. For these reference points, the device 590 can calculate whether the object 592 will adversely affect the magnetic coupling between the WP TX unit 588 and the device 590.

Figure 35:
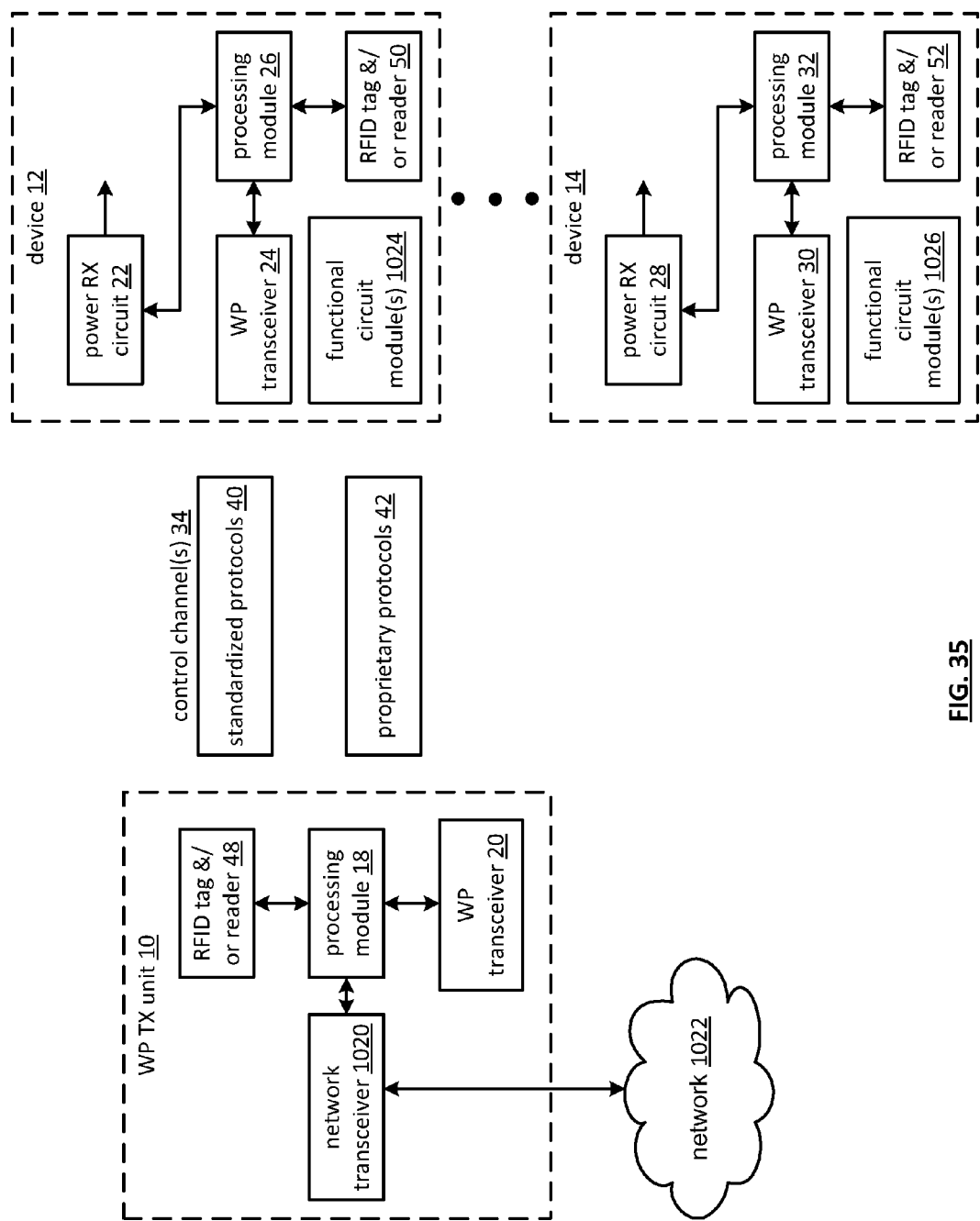
FIG. 35 is a schematic block diagram of another embodiment of a wireless power system in accordance with the present invention.

FIG. 35 is a schematic block diagram of another embodiment of a wireless power system that includes a WP TX unit 10 and a plurality of devices 12-14 (e.g., cell phone, personal AV player, laptop computer, touch panel computer, video game unit, etc.). The WP TX unit 10 includes a processing module 18, the WP transceiver 20, an RFID tag and/or reader 48, a network transceiver 1020, and a power TX circuit (not shown in figure). The network transceiver 1020 may provide a wired or a wireless network connection to a network 1022 (e.g., LAN, WAN, internet, cell telephone network, etc.). As such, the WP TX unit 10 may function as a router for communications between a device 12-14 and the network 1022. The WP TX unit 10 may be incorporated in a network device 12-14 such as a computer, access point, router, modem, etc. The other aspects of the devices 12-14 and the WP TX unit 10 function as previously described.

Figure 36:
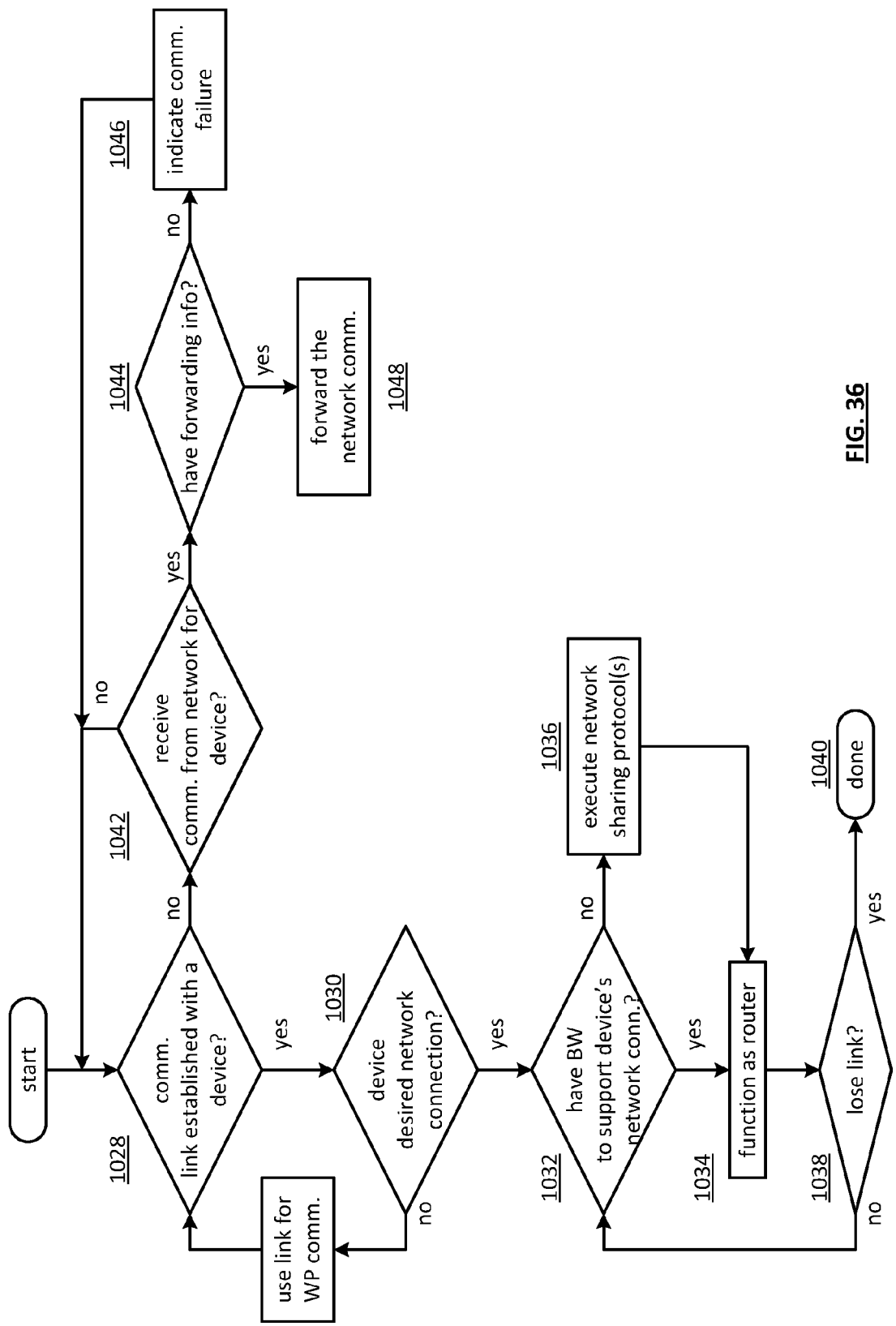
FIG. 36 is a logic diagram of an embodiment of a method for managing communication in a wireless power computer system in accordance with the present invention.

FIG. 36 is a logic diagram of an embodiment of a method for managing communication in a wireless power computer system that begins with the WP TX unit determining whether it has established a communication link with one or more of the devices 1028. If yes, the method continues with the WP TX unit determining whether the device desires access to the network via the WP TX unit 1030. If not, the method repeats from the beginning.

If the device desires network access via the WP TX unit, the method continues with the WP TX unit determining whether it has the bandwidth (BW) to support the device's network access request, which includes a requested data rate 1032. In this instance, the WP TX unit is determining whether it can accommodate the requested data rate in light of its capabilities and the data rates of the other devices it is currently supporting. When the WP TX unit has sufficient bandwidth, the method continues with the WP TX unit functioning as a wireless router for the device with respect to the network 1034.

If the WP TX unit does not have sufficient bandwidth to support the device's request, the method continues with the WP TX unit executing one or more network access sharing protocols 1036. Such protocols may include CSMA, CSMA with collision avoidance, CSMA with collision detection, a token passing scheme, a ring scheme, a priority scheme, etc. The method continues with the WP TX unit functioning as a router for the device with respect to access to the network 1034. The method continues with the WP TX unit determining whether it has lost the communication link with the device 1038. If not, the method repeats at the determine bandwidth step 1032. If yes, the method is complete for this device, but continues for other devices 1040.

If the WP TX unit does not have a communication link established with the device, the method continues with the WP TX unit determining whether it has received a communication from the network for the device 1042. If not, the method repeats from the beginning. If yes, the method continues with the WP TX unit determining whether it can forward the information to the device or provide forwarding information to the network 1044. If not, the method continues with the WP TX unit indicating a communication failure and the method repeats at the beginning 1046. If it does have the forwarding information, the method continues with the WP TX unit forwarding the communication or providing the forwarding information to the network 1048.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A device comprises:
    a wireless power receiver for wireless power transfer, including a receiver resonator, a rectifier, and a DC to DC converter, and configured to:
        receive a wireless power signal from a wireless power transmitting unit; and
        convert the wireless power signal into a power supply;
    a transceiver configured to:
        transmit a control signal over a control channel using a Bluetooth wireless communication standard to the wireless power transmitting unit, wherein the control signal includes information relating to the wireless power transfer.

2. The device of claim 1, wherein the transceiver comprises a radio frequency (RF) transceiver configured to transmit the control signal in compliance with the Bluetooth wireless communication standard.

3. The device of claim 1, wherein the transceiver is further configured to:
    receive the control signal over the control channel using the Bluetooth wireless communication standard from the wireless power transmitting unit; and
    convert the control signal received over the control channel using the Bluetooth wireless communication standard into inbound data, wherein the inbound data includes additional information relating to the wireless power transfer.

4. The device of claim 1, wherein the transceiver is further configured to:
    when the transceiver is not capable of communication using the Bluetooth wireless communication standard, attempt to update the transceiver to support the Bluetooth wireless communication standard.

5. The device of claim 1, wherein the transceiver is further configured to:
    determine whether the transceiver is lacking software to support the Bluetooth wireless communication standard; and
    when the transceiver is lacking software, generate a network message to download the software to support the Bluetooth wireless communication standard.

6. The device of claim 1, wherein the information relating to the wireless power transfer includes at least one of: power level and impedance.

7. The device of claim 1, wherein the wireless power signal and the control signal are in a common frequency band.

8. The device of claim 1, wherein the wireless power signal is in a first frequency band and the control signal is in a second different frequency band.

9. The device of claim 1, wherein the wireless power receiver for wireless power transfer is configured to:
    receive a beacon signal from the wireless power transmitting unit, wherein the beacon signal includes a magnetic field signal transmitted from the wireless power transmitting unit.

10. The device of claim 9, wherein the transceiver is configured to:
    detect the wireless power transmitting unit from the beacon signal; and
    establish the control channel using the Bluetooth wireless communication standard.

11. A device, comprises:
    at least one wireless power transmit circuit including a transmit coil for transmitting a wireless power magnetic field for wireless power transfer, an impedance matching circuit, and a rectify and regulate circuit to convert an AC voltage into a DC voltage, the at least one wireless power transmit circuit configured to:
        generate a beacon signal to detect at least one wireless power receive unit, wherein the beacon signal is a magnetic field signal transmitted from the wireless power transmit circuit; and generate the wireless power magnetic field for wireless power transfer to the at least one wireless power receive unit:

at least one transceiver configured to:
in response to detecting the wireless power receive unit, establish a connection over a Bluetooth control channel with the at least one wireless power receive unit to exchange information relating to the wireless power transfer.

12. The device of claim 11, wherein the at least one transceiver comprises:
a radio frequency (RF) transceiver and wherein the Bluetooth control channel uses one or more portions of a Bluetooth wireless communication standard.

13. The device of claim 11, wherein the wireless power magnetic field and the Bluetooth control channel are in a common frequency band.

14. The device of claim 11, wherein the wireless power magnetic field is in a first frequency band and the Bluetooth control channel is in a second different frequency band.

15. The device of claim 11, wherein the information relating to the wireless power transfer includes at least one of: power level, impedance settings and charging requirements.

16. A wireless power receive unit, comprises:
a wireless power receive circuit configured to convert a wireless power signal from a wireless power transmit unit into a supply voltage;
a receive unit transceiver configured to receive a control signal on a control channel between the wireless power transmit unit and the wireless power receive unit, wherein the control signal complies with one or more portions of a Bluetooth wireless communication standard; and
a receive unit processing module configured to:
identify a protocol version of the Bluetooth wireless communication standard; and
when the receive unit transceiver is capable of communication using the identified protocol version, coordinate configuration of the receive unit transceiver to communicate information regarding the wireless power signal via the control channel using the identified protocol version of the Bluetooth wireless communication standard.

17. The wireless power receive unit of claim 16, wherein the receive unit processing module is further configured to:
when the receive unit transceiver is not capable of communication using the identified protocol version, attempt to update the receive unit transceiver to support the identified protocol version.

18. The wireless power receive unit of claim 16, wherein the receive unit processing module is further configured to:
determine whether the receive unit transceiver is lacking software to support the identified protocol version; and
when the receive unit transceiver is lacking software, generate a network message to download the software to support the identified protocol version.

19. The wireless power receive unit of claim 16, wherein the information regarding the wireless power signal includes at least one of:
a frequency for wireless power transfer;
a number of transmit unit coils;
to reposition the wireless power receive unit to improve wireless power transfer;
a desired power level; and
to tune components of the wireless power receive circuit.

20. The wireless power receive unit of claim 16, wherein the wireless power signal is in a first frequency band and the control signal is in a second different frequency band.

* * * * *